United States Patent
Kanagawa

(10) Patent No.: US 7,233,797 B2
(45) Date of Patent: Jun. 19, 2007

(54) MOBILE COMMUNICATIONS SYSTEM

(75) Inventor: Atsushi Kanagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 299 days.

(21) Appl. No.: 10/080,977

(22) Filed: Feb. 21, 2002

(65) Prior Publication Data

US 2002/0090951 A1 Jul. 11, 2002

Related U.S. Application Data

(63) Continuation of application No. PCT/JP99/05389, filed on Sep. 30, 1999.

(51) Int. Cl.
*H04Q 7/20* (2006.01)

(52) U.S. Cl. .................. 455/446; 455/450; 455/432; 455/460; 455/461; 370/331; 370/332

(58) Field of Classification Search ........ 455/436–444, 455/446, 450, 460–461; 370/330–332, 320, 370/335, 342
See application file for complete search history.

(56) References Cited

U.S. PATENT DOCUMENTS

| | | | | |
|---|---|---|---|---|
| 5,790,528 A * | 8/1998 | Muszynski | .................. | 370/331 |
| 5,828,661 A | 10/1998 | Weaver, Jr. et al. | | |
| 5,901,145 A * | 5/1999 | Sawyer | .................. | 370/332 |
| 5,987,013 A * | 11/1999 | Kabasawa | .................. | 370/331 |
| 6,011,971 A * | 1/2000 | Jolma | .................. | 455/438 |
| 6,075,990 A * | 6/2000 | Shin | .................. | 455/440 |
| 6,111,864 A * | 8/2000 | Kabasawa | .................. | 370/332 |
| 6,230,013 B1 * | 5/2001 | Wallentin et al. | .................. | 455/436 |
| 6,289,221 B1 * | 9/2001 | Ritter | .................. | 455/447 |
| 6,567,670 B1 * | 5/2003 | Petersson | .................. | 455/522 |
| 6,728,528 B1 * | 4/2004 | Loke | .................. | 455/318 |
| 6,980,805 B2 * | 12/2005 | Matsumoto et al. | .................. | 455/440 |
| 2003/0083072 A1 * | 5/2003 | Mostafa | .................. | 455/446 |
| 2005/0026614 A1 * | 2/2005 | Otsuka et al. | .................. | 455/436 |

FOREIGN PATENT DOCUMENTS

EP 0 577 960 A1 1/1994

(Continued)

OTHER PUBLICATIONS

Japanese Office Action dated Sep. 12, 2003.

(Continued)

*Primary Examiner*—Jean Gelin
*Assistant Examiner*—Khawar Iqbal
(74) *Attorney, Agent, or Firm*—Matten Muchin Rosenman LLP

(57) ABSTRACT

A base station device 31 provided in a general cell 41 is accommodated in a base station controller 21, and a base station device 32 provided in a general cell 42 is accommodated in a base station controller 22. A base station device 33 provided in a boundary cell 43 that is adjacent to both the general cells 41 and 42 is accommodated in both the base station controllers 21 and 22. Frequencies RF#1 and RF#2 are allocated to each of the general cells 41 and 42 and boundary cell 43. Communications conducted by the base station device 33 using the frequency RF#1 is controlled by the base station controller 21, and communications conducted by the base station device 33 using the frequency RF#2 is controlled by the base station controller 22.

12 Claims, 17 Drawing Sheets

FOREIGN PATENT DOCUMENTS

| | | |
|---|---|---|
| GB | 2 328 589 | 2/1999 |
| JP | 09261162 | 10/1997 |
| JP | 9-511107 | 11/1997 |
| WO | WO 95/20865 | 8/1995 |
| WO | WO 96/02117 | 1/1996 |

OTHER PUBLICATIONS

European Search Report dated Sep. 7, 2004.
Communication pursuant to Article 96(2) EPC dated Jun. 6, 2006.
Chinese Office Action dated Sep. 23, 2005 with translation.
European Office Action dated Dec. 27, 2005.
European Office Action dated Jul. 16, 2003 for corresponding European Patent Application 99 974 075.6 - 2412.
European Search Report dated Oct. 11, 2002 for corresponding European Patent Application 99 974 075.6 - 2412.
Chinese Office Action dated Sep. 12, 2003 for Corresponding Chinese Patent Application.

\* cited by examiner

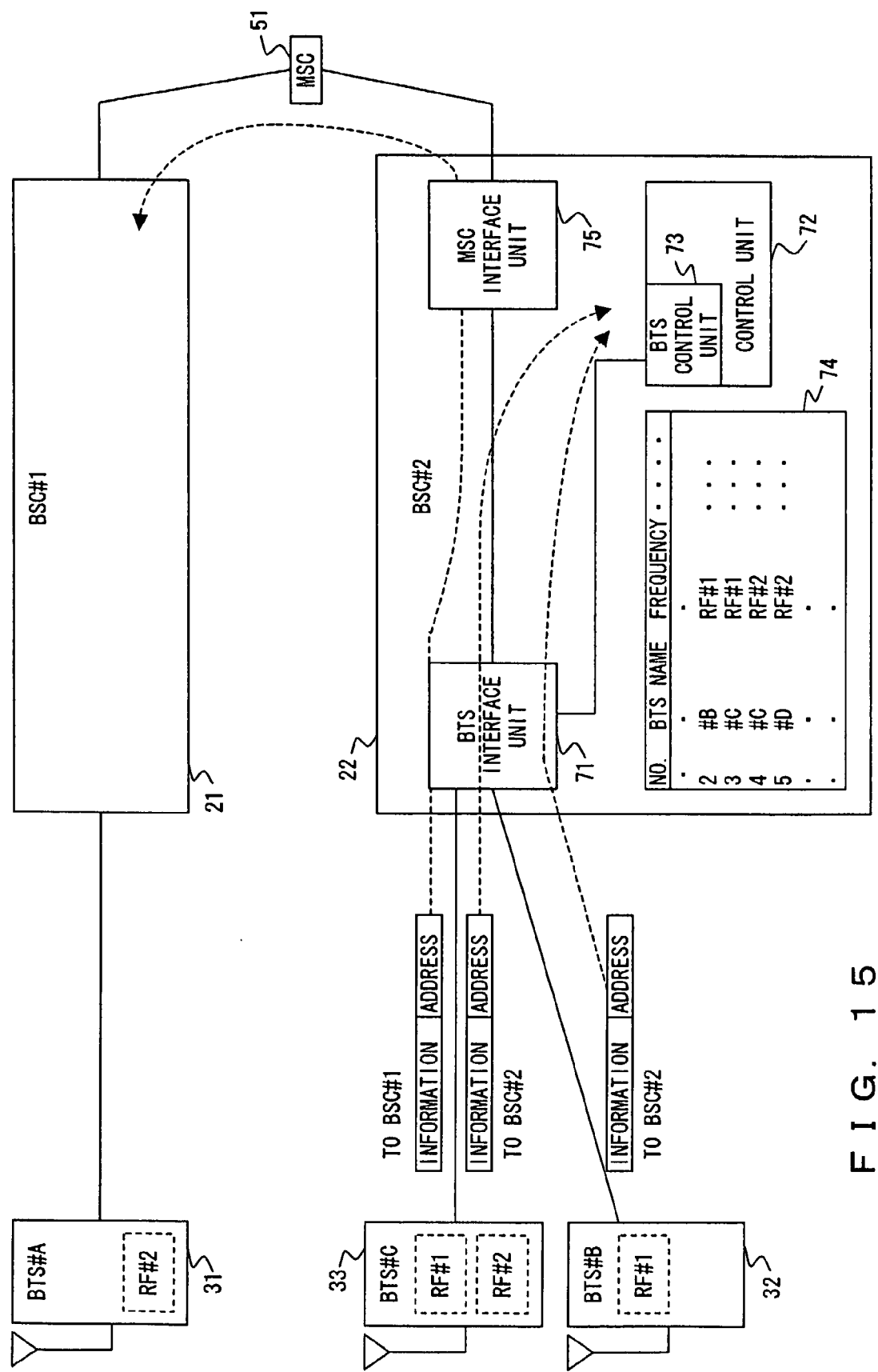
F I G. 15

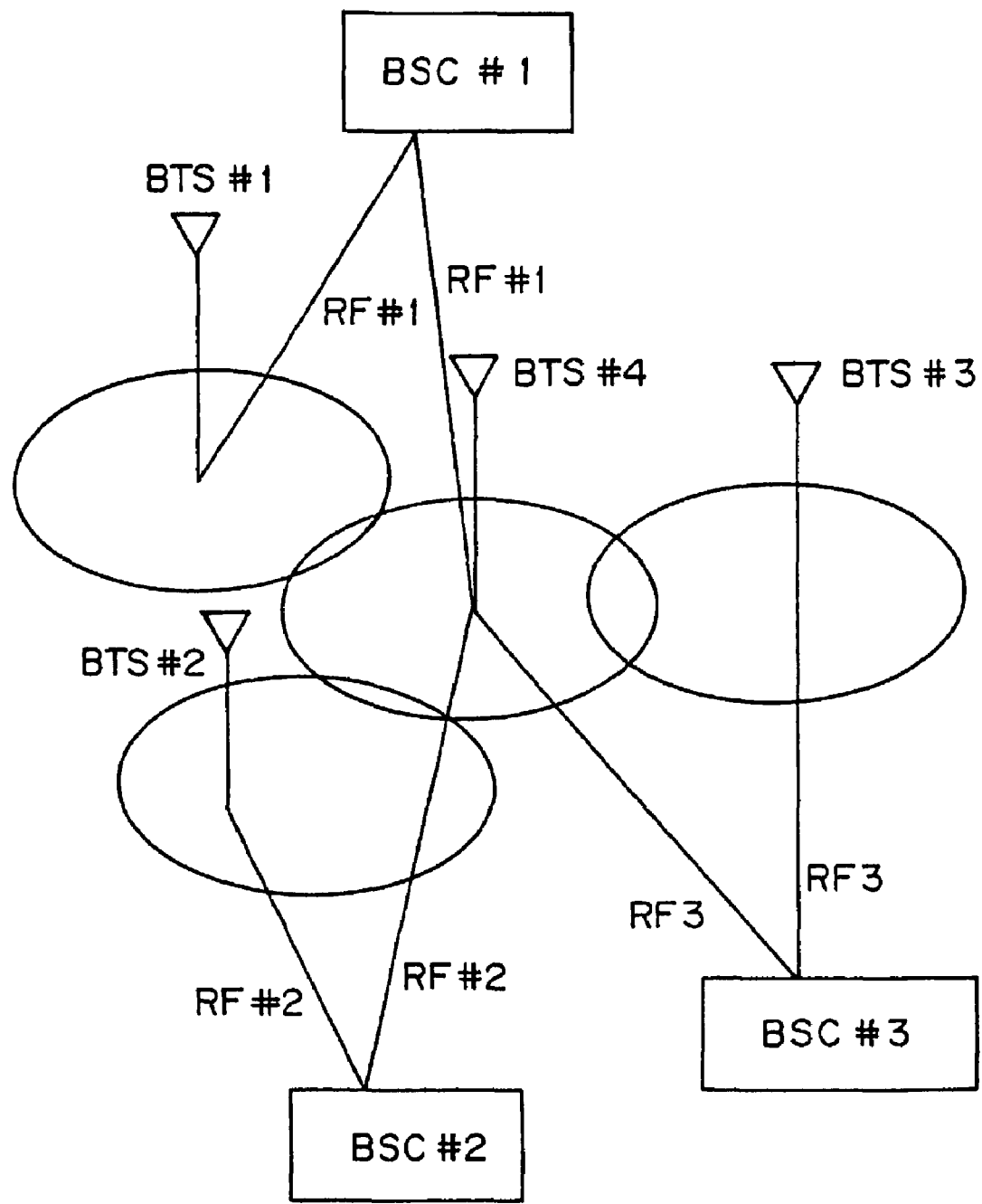
F I G. 17

MOBILE COMMUNICATIONS SYSTEM

CROSS REFERENCE TO RELATED APPLICATION

This application is a continuation of International Application No. PCT/JP99/05389, which was filed on Sep. 30, 1999.

BACKGROUND OF THE INVENTION

1. Field of the Invention

The present invention relates to a mobile communications system with hand-off control, and in particular, relates to a CDMA mobile communications system with hand-off control.

2. Description of the Related Art

In a mobile communications system, usually, a communications area is divided into many wireless communications areas, each called a "cell", and base stations are provided in each area. Then, a mobile station is accommodated in one of the base stations in the communications area, and is connected to another communications terminal through the base station.

FIG. 1 shows the configuration of a general mobile communications system. In this specification, a CDMA mobile communications system, which has recently been spread, is used as an example.

In each cell, a base station device (BTS: base station transceiver subsystem) is provided. The base station device can simultaneously accommodate a plurality of mobile stations (MS), and transmits/receives radio data to/from a mobile station. Each base station device is accommodated in a base station controller (BSC).

The base station controller accommodates a plurality of base station devices and controls them. The base station controller is also connected to a mobile services switching center (MSC) and transmits/receives data to/from it, as requested. The mobile services switching center is connected to another switching center and a public switched telephone network (PSTN) is composed of the plurality of switching centers.

In a CDMA mobile communications system, a different spread code is assigned to each mobile station. Then, data that are encoded using the spread code and transmitted between a mobile station and a base station device.

A mobile station often moves from one cell to another cell while communicating with another communications terminal. A transition from a state where a mobile station is accommodated in a base station device into a state where the mobile station is accommodated in another base station device, when the mobile station moves from a cell to another cell, is called "hand-off" (or "hand-over").

A hand-off operation is largely classified into two categories: a "soft hand-off" and a "hard hand-off". In the soft hand-off, even when moving from one cell to another cell, a mobile station is always connected to at least one base station device. Therefore, in the soft hand-off, a channel between the mobile station and base station device is never disconnected, and, accordingly, communications are never interrupted. In the system shown in FIG. 1, the soft hand-off occurs, if a mobile station moves between cells that are controlled by the same base station controller and if the same frequency can be allocated.

In the hard hand-off, when moving from one cell to another cell, the mobile station is temporarily disconnected from the base station device and then is connected to another base station device. In this case, synchronization must be established again between the mobile station and the base station device. Thus, in the hard hand-off, a channel between a mobile station and a base station device is temporarily disconnected and, accordingly, communications are interrupted. Therefore, a user is often disconcerted. In the system shown in FIG. 1, the hard hand-off occurs when a mobile station moves between cells each of which is controlled by a different base station controller. In other words, the hard hand-off occurs when a mobile station crosses an "accommodation boundary". The hard hand-off also occurs when a mobile station moves between cells, to each of which a different frequency is allocated.

FIG. 2 shows the configuration of the existing mobile communications system, and the configuration covers the vicinity of a boundary between areas each of which is controlled by a different base station controller. In this example, a base station controller 1 (BSC#1) accommodates base station devices 11 (BTS#A) and 12 (BTS#B), and a base station controller 2 (BSC#2) accommodates a base station device 13 (BTS#C). Here, it is assumed that the base station devices 11 through 13 control the cell-a through cell-c, respectively, and the same radio frequency is allocated to all of the cells.

If a mobile station moves from cell-a to cell-b, or from cell-b to cell-a, a soft hand-off occurs since both the base station devices 11 (BTS#A) and 12 (BTS#B) are accommodated in the base station controller 1 (BSC#1). However, if the mobile station moves from cell-b to cell-a or from cell-c to cell-b, a hard hand-off occurs since each of the base station devices 12 (BTS#B) and 13 (BTS#C) is accommodated in a different base station controller.

Therefore, if as shown in FIG. 3, the mobile station moves back and forth between cell-b and cell-c several times while communicating, many hard hand-offs occur, and the user will be disconcerted and feel unassured.

As described above, in the existing mobile communications system, a hard hand-off is easy to occur in the vicinity of a boundary between particular communications areas, and a user feels uncomfortable.

SUMMARY OF THE INVENTION

An object of the present invention is to reduce the occurrence of hard hand-offs in a mobile communications system.

In the mobile communications system of the present invention, first and second frequencies are allocated to each wireless communications area. The mobile communications system comprises a first base station device provided in a first wireless communication area, a second base station device provided in a second wireless communications area, a third base station device provided in a third wireless communications area adjacent to the first and second wireless communications areas, a first controller for accommodating the first base station device and managing communications conducted using the first frequency by the third base station device and a second controller for accommodating the second base station device and managing communications conducted using the second frequency by the third base station device.

In the mobile communications system, the first controller controls both the first and third base station devices. Thus, when the mobile station moves between the first and third wireless communications areas, a soft hand-off occurs. Similarly, the second controller controls both the second and third base station devices. Thus, when the mobile station moves between the second and third wireless communications areas, a soft hand-off occurs.

The mobile communications system in another aspect of the present invention comprises a first base station device provided in a first wireless communications area to which at least a first frequency is allocated, a second base station device provided in a second wireless communications area to which at least a second frequency is allocated, a third base station device provided in a third wireless communications area that is adjacent to the first and second wireless communications areas and to which the first and second frequencies are allocated, a first controller for accommodating the first base station device and managing communications conducted using the first frequency by the third base station device and a second controller for accommodating the second base station device and managing communications conducted using the second frequency by the third base station device.

In the mobile communications system of this aspect, when a mobile station moves between the first and second wireless communications areas or between the second and third wireless communications areas, a soft hand-off occurs for the reason described above.

The system in another aspect of the present invention comprises a first base station for conducting wireless communications using at least a first frequency, a second base station for conducting wireless communications using at least a second frequency different from the first frequency, a third base station which is adjacent to the first and second base stations and which conducts wireless communications using at least the first and second frequencies, a first base station controller for managing the first frequency used at least in the first and third base stations and a second base station controller for managing the second frequency used at least in the second and third base stations. The first and second base station controllers further comprise controlling means for allocating the same frequency if there is a hand-off between base stations controlled by the corresponding base station controllers.

In this system, for example, the first and second base station controllers can also comprise instructing means for instructing said first base station to use the first frequency when there is a hand-off from said third base station to said first base station, and instructing said second base station to use the second frequency when there is a hand-off from said third base station to said second base station.

The base station of the present invention is adjacent to a base station using a plurality of frequencies and uses at least one of the frequencies shared with the base station. The base station device comprises controlling means for performing a soft hand-off process if there is a hand-off from this base station to the adjacent base station when the shared frequency is used, and performing a hard hand-off process using the shared frequency if there is a hand-off from adjacent base station to this base station when a frequency other than the shared frequency is used in the adjacent base station. The base station in another aspect of the present invention is adjacent to at least first and second base stations. The base station comprises a first wireless unit using a part or all of frequencies used by the first base station as a first shared frequency; a second wireless unit using a part or all of frequencies used by the second base station as a second shared frequency; and controlling means for performing a soft hand-off using the first shared frequency if there is a hand-off from the first base station to this base station when the first shared frequency is used, performing a soft hand-off using the second shared frequency if there is a hand-off from the second base station to this base station when the second frequency is used, performing a hard hand-off process for switching the frequency from the second shared frequency to the first shared frequency if there is a hand-off from this base station to the first base station when the second shared frequency is used, and performing a hard hand-off process for switching the frequency from the first shared frequency to the shared second frequency if there is a hand-off from this base station to the second base station when the first shared frequency is used.

The base station controller of the present invention is connected to a plurality of base stations and performs with priority a soft hand-off if there is a hand-off between the connected base stations, and communications conducted before and after the hand-off is controlled by this base station controller. The base station controller comprises controlling means for controlling, for at least one of the plurality of base stations, only communications conducted using a part of frequencies used by the at least one of the plurality of base stations, and allocating one of the part of the frequencies if there is a hand-off when a mobile station using a frequency that is not controlled by this base station controller in the at least one of the plurality of base stations moves to an area controlled by another base station to which this base station controller is connected.

BRIEF DESCRIPTION OF DRAWINGS

FIG. 11A shows a hand-off operation in the existing mobile communications system and FIG. 11B shows a hand-off operation in the mobile communications of the embodiment.

FIG. 15 shows the configuration and operation of a base station controller that accommodates a base station device provided in a boundary cell.

FIG. 17 shows a system in which three or more cells are adjacent to one another.

DESCRIPTION OF THE PREFERRED EMBODIMENTS

The embodiments of the present invention are described below.

Figure 1:
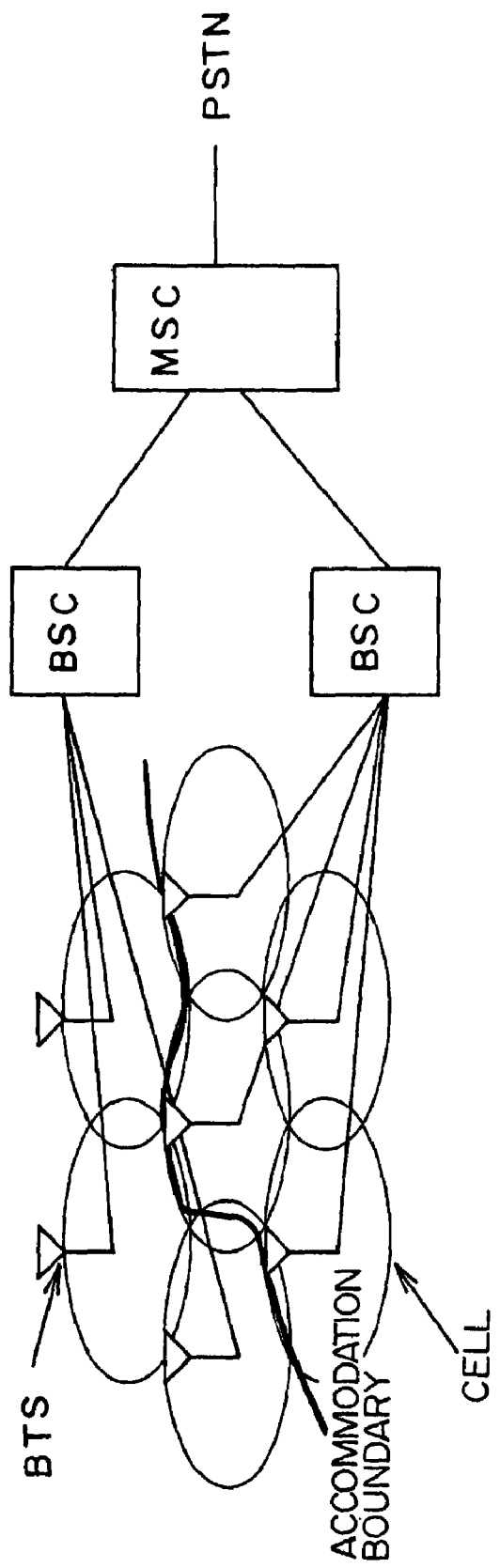
FIG. 1 shows the configuration of a general mobile communications system.

The entire configuration of the mobile communications system in this embodiment is basically the same as that of the existing mobile communications system shown in FIG. 1. Specifically, a base station device (BTS) is provided for each cell, and each base station device is controlled by a base station controller (BSC). Then, each base station controller is accommodated in a mobile services switching center (MSC). However, in the mobile communications system of this embodiment, a hand-off operation in the vicinity of a boundary between communications areas, each of which is controlled by a different base station controller, is different from that of the existing mobile communications system.

Figure 4:
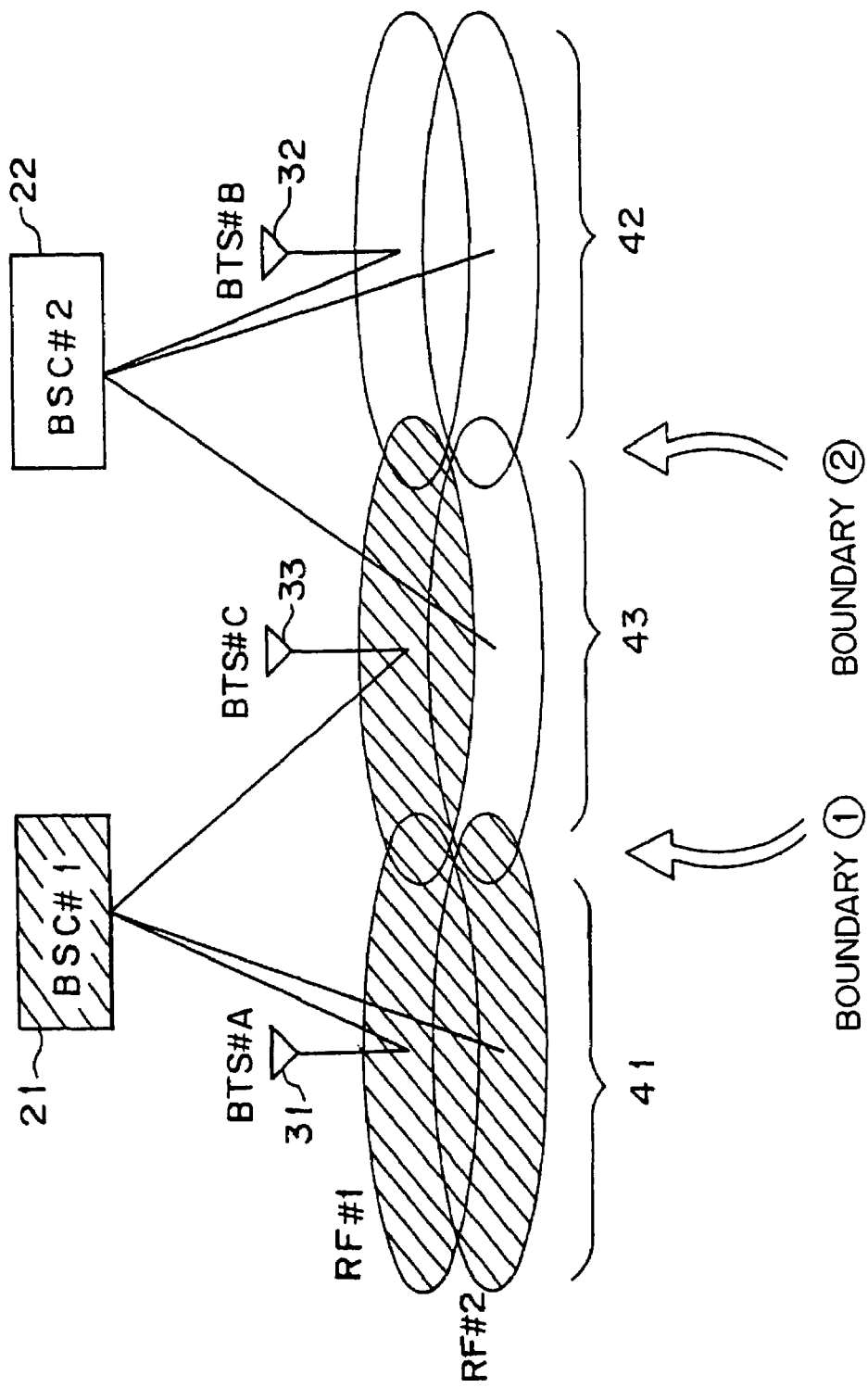
FIG. 4 shows the basic configuration of the mobile communications system of the embodiment.

FIG. 4 shows the basic configuration of the mobile communications system in the embodiment and in particular shows the configuration in the vicinity of a boundary between communications areas each of which is controlled by a different base station controller. Specifically, FIG. 4 shows the configuration in the vicinity of a boundary between a communications area controlled by a base station controller (BSC#1) 21 and a communications area controlled by a base station controller (BSC#2) 22.

In this mobile communications system, two frequencies (RF#1 and RF#2) are allocated to each cell. General cells 41 and 42 are ordinary cells. A boundary cell 43 is a cell located in a boundary area between a communications area controlled by the base station controller 21 and a communications area controlled by the base station controller 22. If the general cells 41 and 42 already overlap, a base station device (BTS) 33 can be provided in such a way to cover the overlapped area.

A base station device (BTS#A) 31 and a base station device (BTS#B) 32 are provided in the general cells 41 and 42, respectively. The base station device 31 is accommodated in the base station controller 21 and transmits/receives radio data to/from a mobile station located in the general cell 41 using the frequency RF#1 or RF#2. The base station device 32 is accommodated in the base station controller 22 and transmits/receives radio data to/from a mobile station located in the general cell 42 using the frequency RF#1 or RF#2.

The base station device (BTS#3) 33 is provided in the boundary cell 43. The base station device 33 is accommodated in both the base station controllers 21 and 22. Specifically, among communications in which the base station device 33 is participated, communications conducted using the frequency RF #1 is managed by the base station controllers 21, and communications conducted using the frequency RF #2 is managed by the base station controllers 22. In other words, the base station device 33 transmits/receives radio data using the frequency RF#1 to/from a mobile station located in the boundary cell 43 under the control of the base station controller 21, and transmits/receives radio data using the frequency RF#2 to/from a mobile station located in the boundary cell 43 under the control of the base station controller 22.

As described above, in the mobile communications system of the embodiment, abase station device provided in a general cell is accommodated in one corresponding base station controller, while a base station device provided in a boundary cell is accommodated in a plurality of base station controllers.

Figure 5:
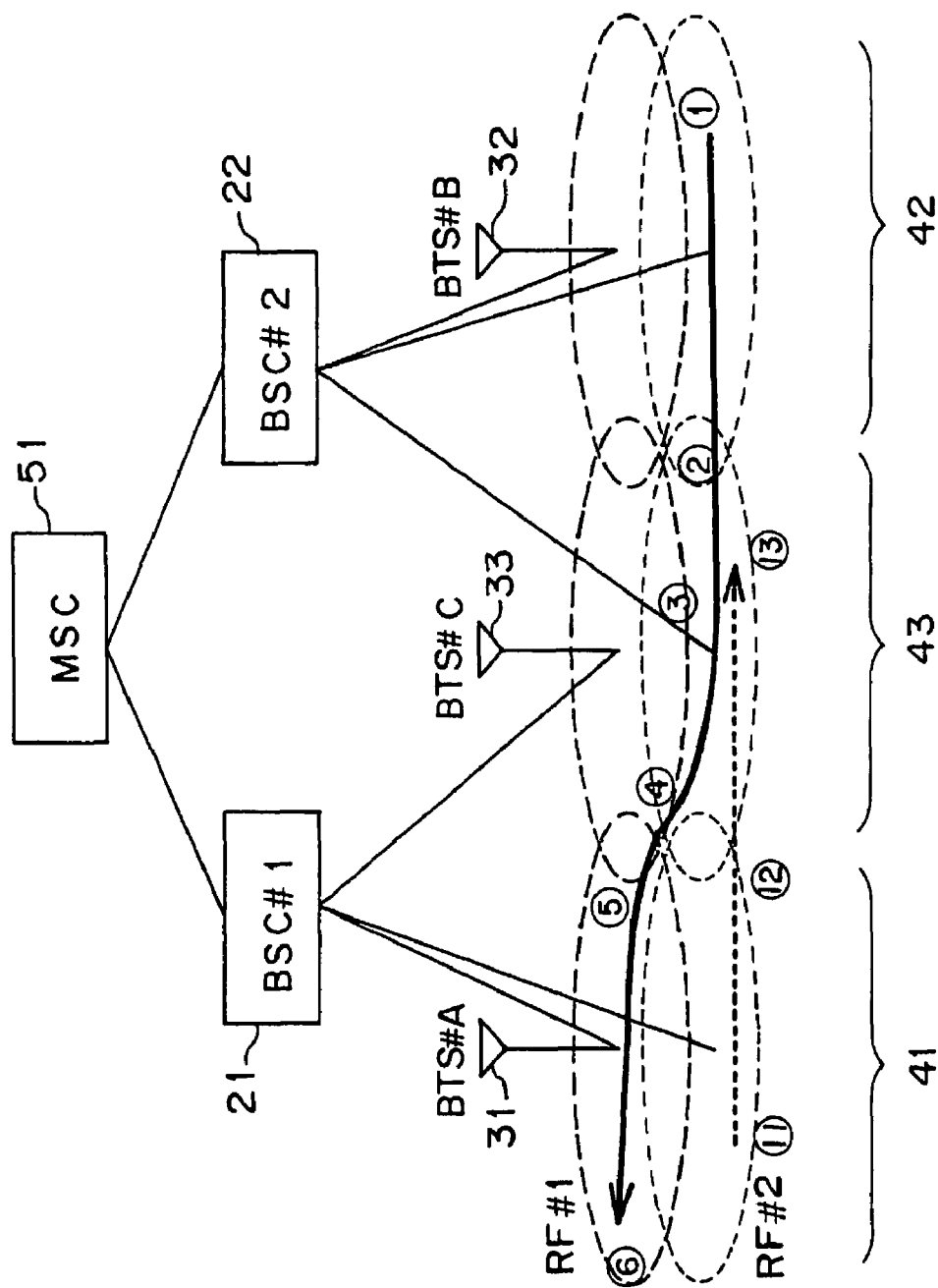
FIG. 5 shows the hand-off operation in the mobile communications system of the embodiment.

FIG. 5 shows a hand-off operation in the mobile communications system of the embodiment. Here a hand-off operation in the case where a mobile station moves in the vicinity of a boundary between areas, each of which is controlled by a different base station controller, specifically in the case where a mobile station moves between a general cell and a boundary cell. A hand-off operation in the case where a mobile station moves between general cells is the same as that of the conventional mobile communications system.

In FIG. 5, physical transmission lines are provided between the base station device 31 and the base station controller 21, between the base station device 32 and the base station controller 22, between the base station device 33 and the base station control 21, and between the base station device 33 and the base station controller 22, respectively. For the physical transmission lines, for example, an optical fiber cable or a metallic cable and the like are used. Physical transmission lines are also provided between the mobile services switching center 51 and each of the base station controllers 21 and 22. The physical transmission line can be replaced by radio transmission path. An arrow symbol with (1) through (6) and a narrow symbol with (11) through (13) indicate the travel tracks of a mobile station.

As shown in FIG. 5, it is assumed that a mobile station is located in the general cell 42 and accommodated in the base station device 32 using frequency RF#2 (state (1)). Then, when this mobile station moves up to an overlapped area between the general cell 42 and the boundary cell 43, a hand-off occurs (state (2)). This hand-off is switching from a channel using the frequency RF#2 in the general cell 42 to a channel using the frequency RF#2 in the boundary cell 43. Here, among communications in which the base station device 33 is participated, communications conducted using the frequency RF #2 is managed by the base station controller 22. Specifically, the base station controller 22 controls communications conducted before and after the hand-off, and the same frequency is used in both the communications. Therefore, this hand-off is a soft hand-off without channel disconnection. Then, this mobile station is accommodated by the base station device 33 (state (3)). In this communication, the frequency RF#2 is still used.

Then, when this mobile station moves up to an overlapped area between the boundary cell 43 and the general cell 41, a hand-off occurs again (states (4) and (5)). This hand-off is switching from a channel using the frequency RF#2 in the boundary cell 43 to a channel using a frequency RF#1 in the general cell 41. Here, the base station controller 22 controls the communications conducted before the hand-off, while the base station controller 21 controls the communications conducted after the hand-off. Therefore, this hand-off is a hard hand-off. Then, this mobile station is accommodated by the base station device 31 (state (6)). In this communication, the frequency RF#1 is used.

When a mobile station using the frequency RF#2 in the general cell 41 moves up to an overlapped area between the general cell 41 and the boundary cell 43, a hand-off from a channel using the frequency RF#2 in the general cell 41 to a channel using the frequency RF#2 in the boundary cell occurs (state (12)). In this case, since a different base station controller performs control of each of the channels before and after the hand-off, a hard hand-off occurs.

As described above, in the mobile communications system, if a mobile station moves from a general cell to a boundary cell, the mobile station uses the same frequency used in the general cell before a hand-off in the destination boundary cell. If a mobile station moves from a boundary cell to a general cell, in the example shown in FIG. 5, in the destination general cell, the mobile station uses a frequency different from the frequency used in the boundary cell before a hand-off. However, even if a mobile station moves from a boundary cell to a general cell, in the destination general cell, the mobile station sometimes uses the same frequency as that used in a boundary cell before a hand-off. A method for determining a radio frequency to be used in a destination cell of a mobile station after a hand-off is described below.

Figure 6:
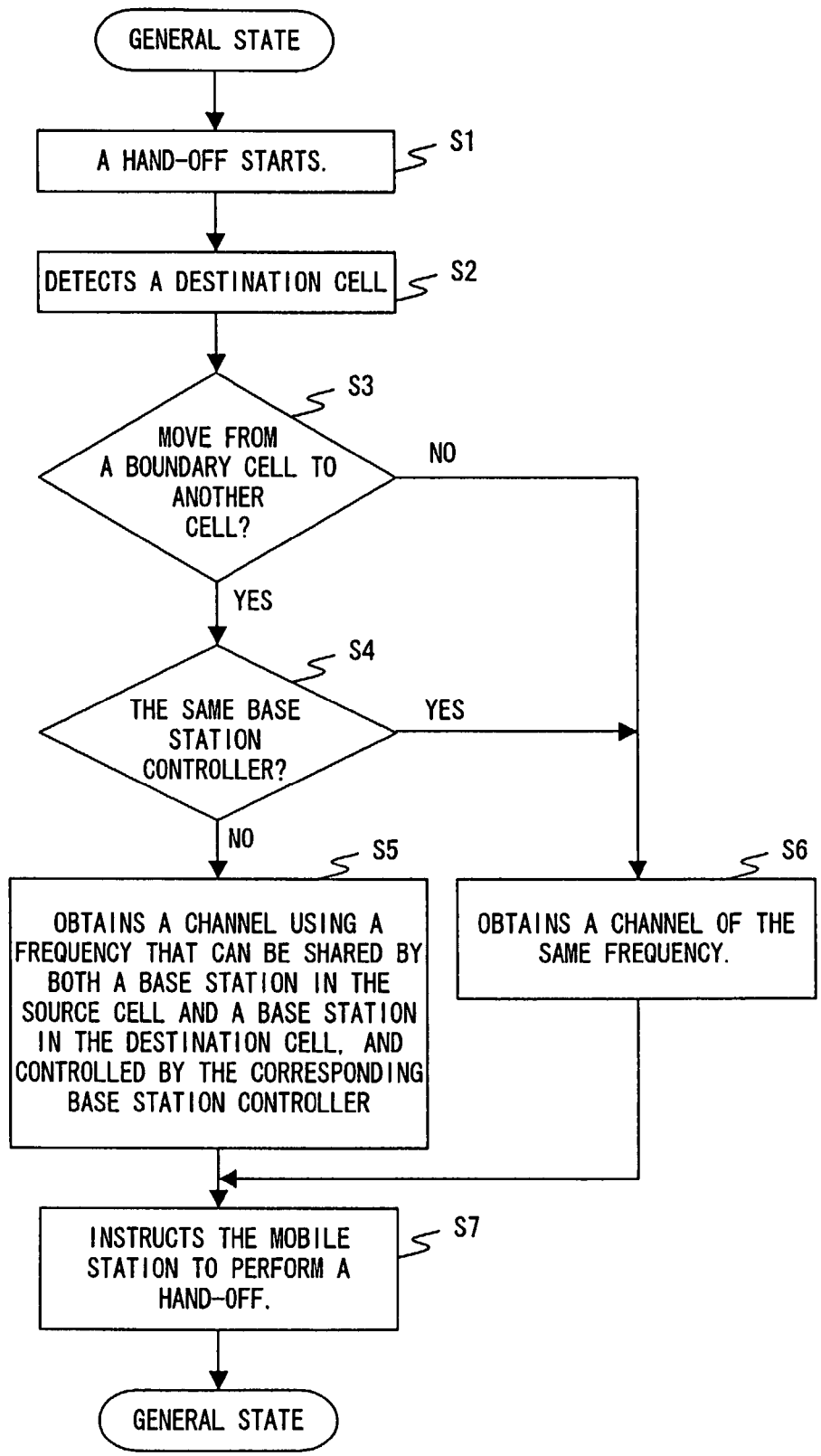
FIG. 6 is a flowchart showing the hand-off operation of the embodiment.

FIG. 6 is a flowchart showing the hand-off operation of the embodiment. An "general state" means a state where a mobile station communicates with another communications terminal in the mobile communications system of the embodiment. When a mobile station moves to the vicinity of a boundary between cells while holding communications, processes in and after step S1 are performed.

In step S1, a hand-off process is started. Specifically, when a mobile station moves to the vicinity of a boundary between cells, the mobile station transmits a hand-off request to a base station device that accommodates the mobile station. Then, on receipt of this request, the base station device notifies a base station controller that accommodates the base station device of the request.

In step S2, the destination cell is detected. The base station controller that receives the request recognizes this destination cell. Since the processes in steps S1 and S2 are also performed in the existing mobile communications system, the detailed description is omitted here.

In step S3, it is judged whether the mobile station moves from a boundary cell to its adjacent cell or from a general cell to its adjacent cell. Information indicating whether a cell is a general cell or a boundary cell is registered in a base station controller.

If the mobile station moves from a boundary cell to its adjacent cell, in step S4, it is judged whether a base station controller that manages communications in which a frequency used by the mobile station in the boundary cell is used and a base station controller that manages the destination cell are the same. If these two base station controllers are different, the flow proceeds to step S5. In step S5, a channel with a frequency different from that currently used by the mobile station is obtained in the destination cell of the mobile station. Alternatively, a channel with a frequency that can be shared by the base station devices in the source cell and the destination cell, and that is managed by the base station controller of the destination cell, is obtained.

If the mobile station moves from a general cell to its adjacent cell (in step S3:No) or if the two base station controllers are the same (in step S4:Yes), the flow proceeds to step S6. In step S6, a channel using the same frequency as that currently used by the mobile station is obtained in the destination cell of the mobile station.

In step S7, a hand-off instruction is issued to the mobile station. This hand-off instruction includes information about the frequency of the channel obtained in steps S5 or S6. Then, the mobile station is connected to a base station device provided in the destination cell, according to the hand-off instruction. Then, the mobile station is accommodated in the base station device of the destination cell.

Figure 7:
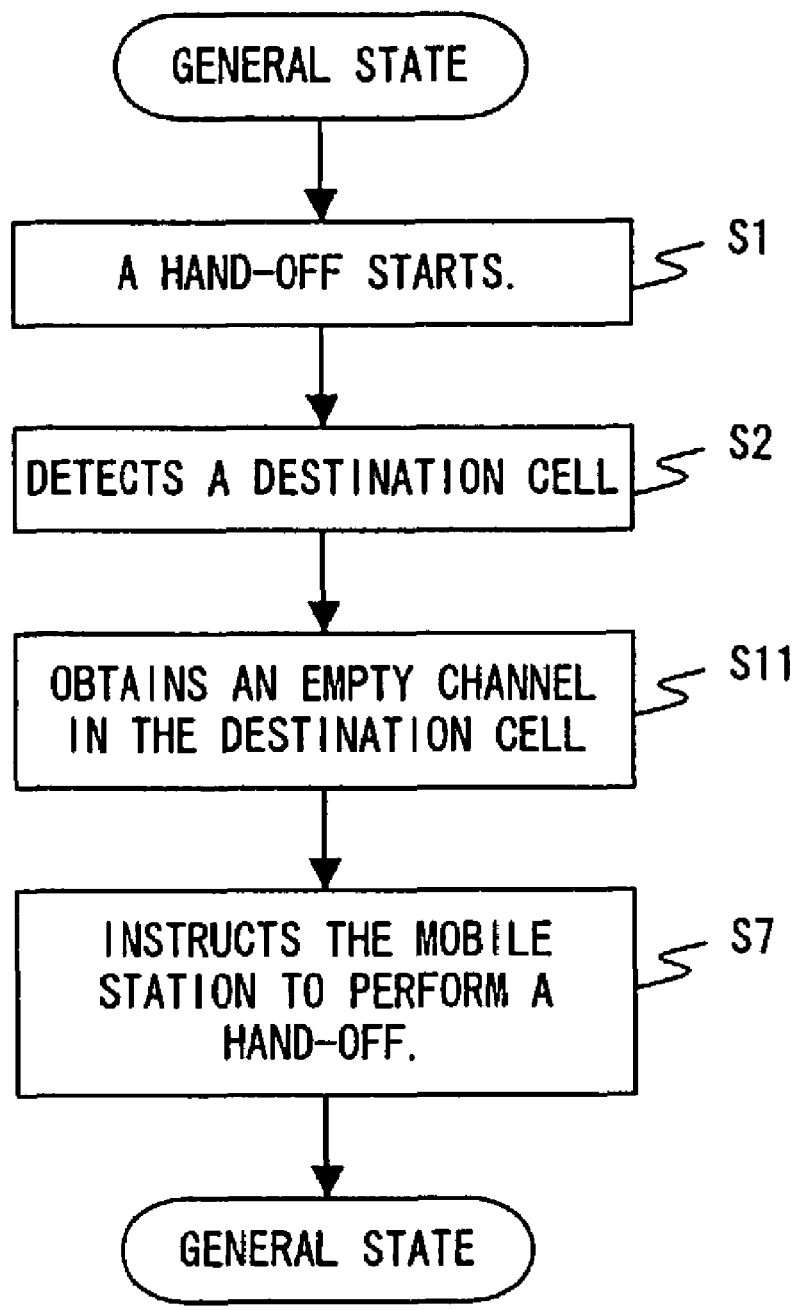
FIG. 7 is a flowchart showing the hand-off operation in the existing mobile communications system.

The characteristic point of the hand-off operation of this embodiment is the steps S3 through S6. Specifically, as shown in FIG. 7, in the existing mobile communications system, when a hand-off operation is started and a destination cell is detected, a channel to be used in the destination cell is simply obtained regardless of whether the mobile station crosses the boundary of communications areas controlled by a base station controller (step S11). In the existing system, there is no concept that cells should be categorized into general cells and boundary cells.

Figure 2:
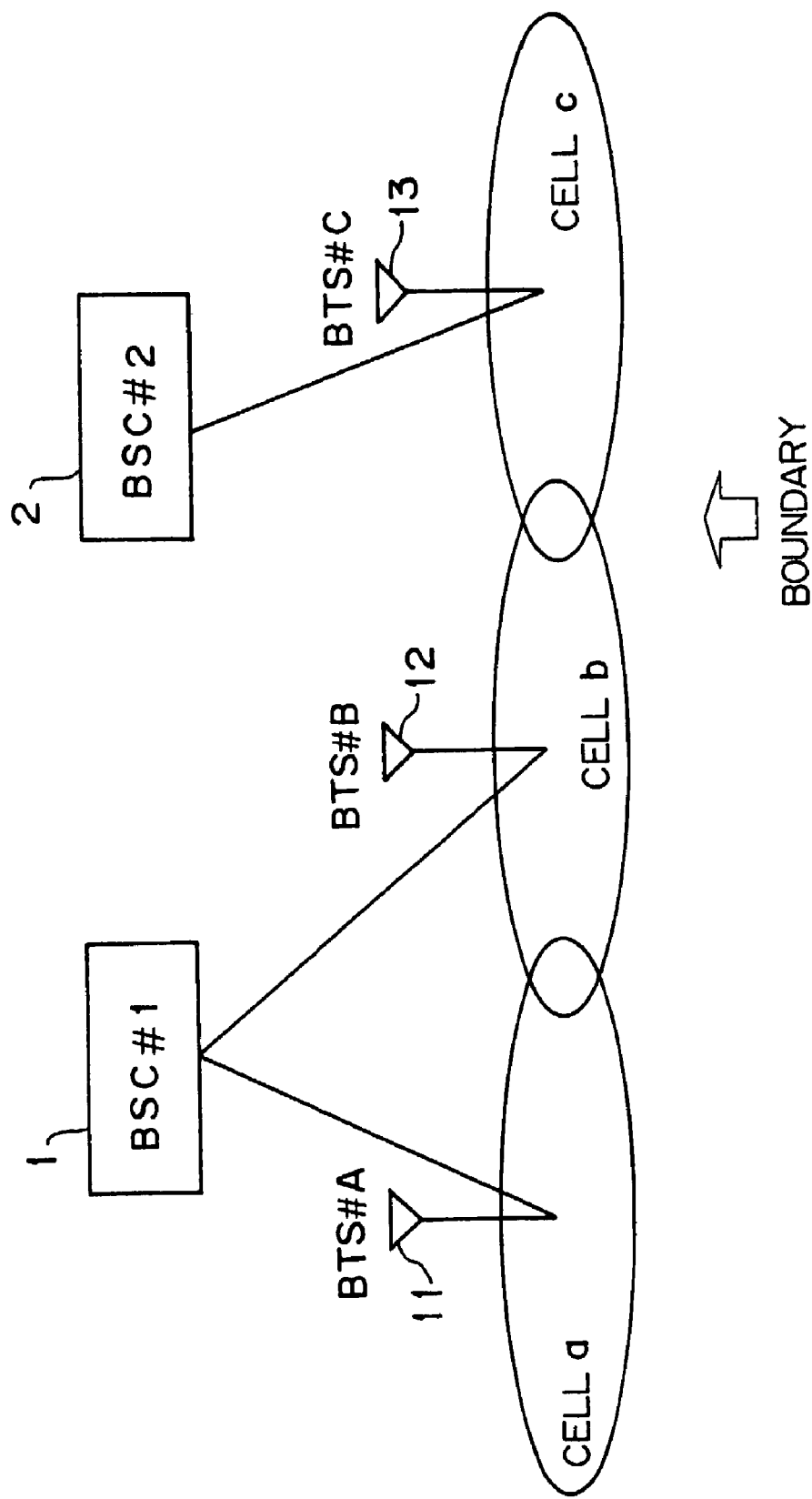
FIG. 2 shows the configuration of the existing mobile communications system.

In addition, as shown in FIG. 2, in the conventional mobile communications system, a hard hand-off is always performed regardless of a used frequency if a mobile station moves between cell-b and cell-c on a boundary between areas each of which is controlled by a different BSC. Thus, a hard hand-off frequently occurs in the specific area (a boundary between areas each of which is controlled by a different BSC).

However, in the mobile communications system of this embodiment, when a mobile station moves between general cells controlled by the same base station controller, a soft hand-off with the allocation of the same frequency is performed, and when the mobile station moves from a general cell to a boundary cell, a hand-off with the allocation of the same frequency is performed. This operation provides the following effects.

Figure 3:
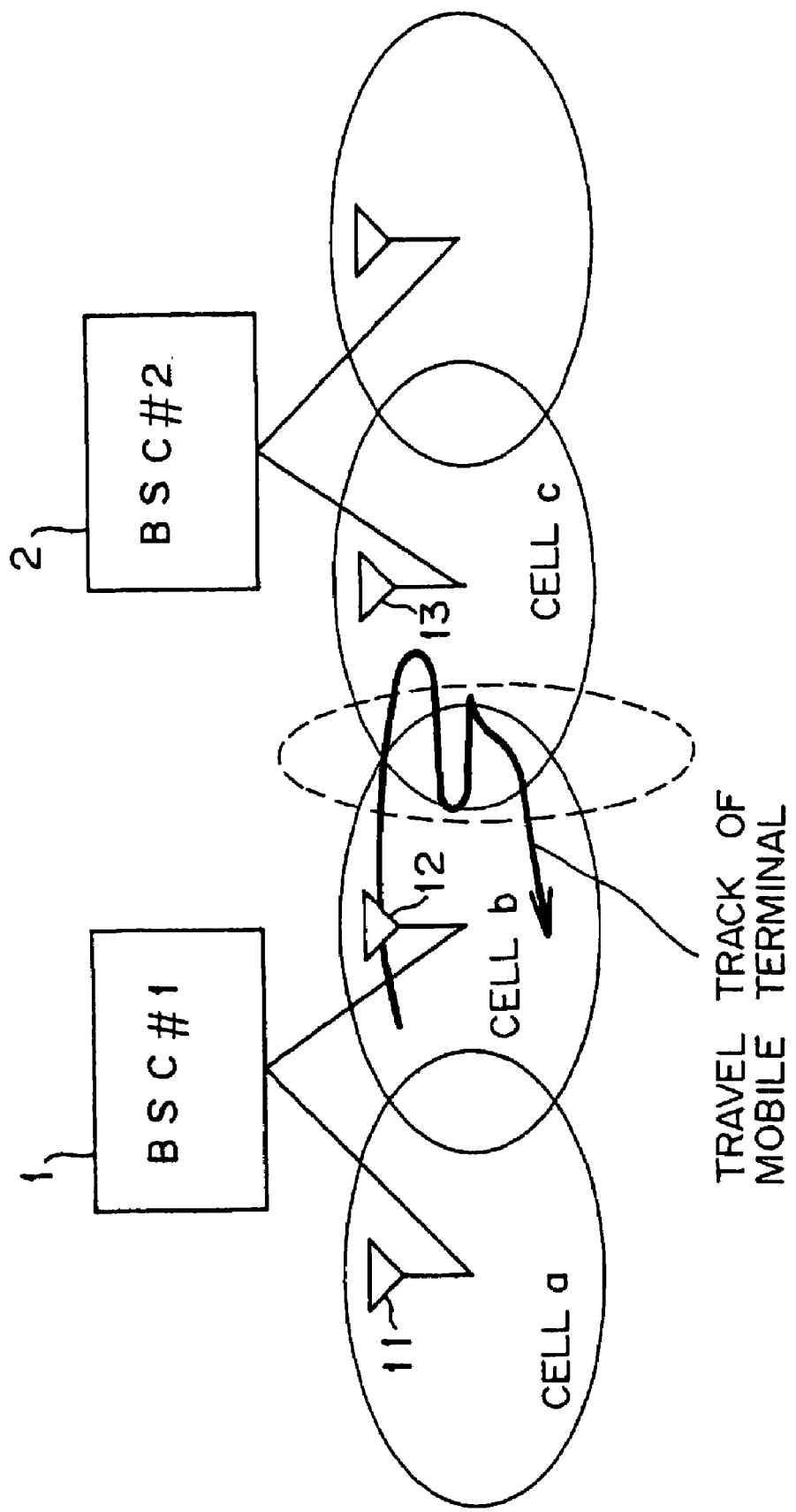
FIG. 3 shows the problems of the existing mobile communications system.

Specifically, according to this frequency allocation, a soft or hard hand-off is performed depending on a used frequency, when a mobile station moves between a general cell 41 and a boundary cell 43 (BSC boundary (1)), or when the mobile station moves between a general cell 42 and a boundary cell 43 (BSC boundary (2)), in FIG. 4. If RF#1 is used in a general cell 41 (if RF#2 is used in a general cell 42), a hard hand-off is not performed even when the mobile station crosses back and forth across the BSC boundary (1) (BSC boundary (2)). Therefore, the occurrence of hard hand-offs in the specific area (BSC boundaries (1) and (2)) can be reduced compared with that of the conventional system, and there will be no area where a hard hand-off frequently occur, such as between cell-b and cell-c in FIG. 3.

Figure 8:
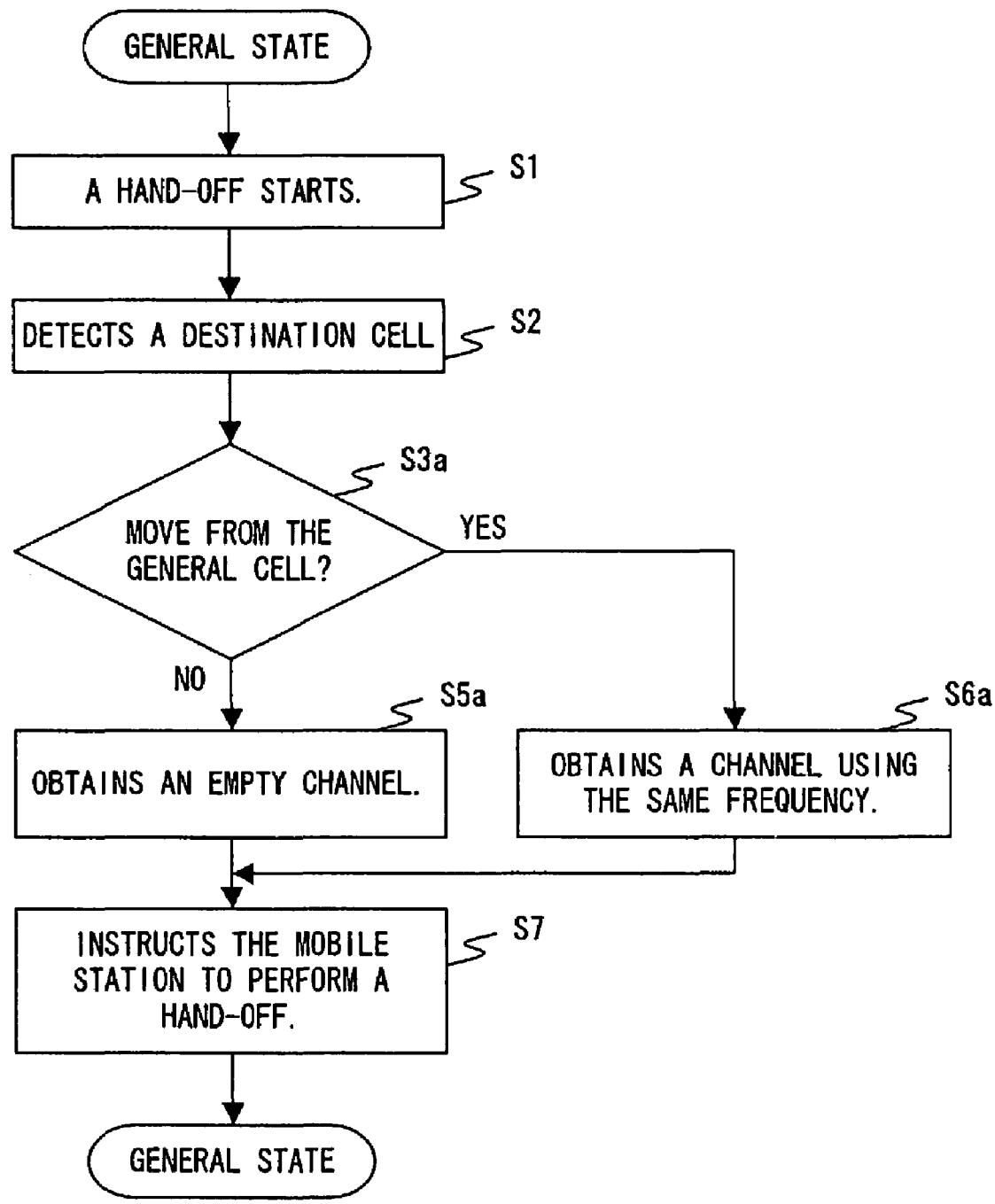
FIG. 8 is a flowchart showing another hand-off operation of the embodiment.

This control can be obtained by performing the process shown in the flowchart of FIG. 8. The flowchart shown in FIG. 8 can be obtained by replacing steps S3 through S6 in the flowchart of FIG. 6 with steps S3a, S5a and S6a. In step S3a, it is judged whether a mobile station moves from a general cell to its adjacent cell. If the mobile station does not move from a general cell to its adjacent cell, in step S5a, an empty channel is obtained. If the mobile station moves from a general cell to its adjacent cell, in step S6a, a channel with the same frequency is obtained.

Alternatively, RF#3 and RF#4 can also be further allocated to the general cells 41 and 42, respectively. In this case, the frequencies (RF#1 and RF#2) used in the adjacent general cells 41 and 42 can be allocated to the boundary cell 43, as shown in FIG. 5. It is preferable to allocate all the frequencies allocated to the adjacent cells 41 and 42. Specifically, RF#1 through RF#4 are allocated to the boundary cell 43. Simultaneously, BSC 21 controls RF #1 and RF #3, and BSC 22 controls RF#2 and RF#4. In this case, each BSC allocates the same frequency as that used in a general cell to a mobile station, when the mobile station moves from the general cell to the boundary cell.

Figure 9:
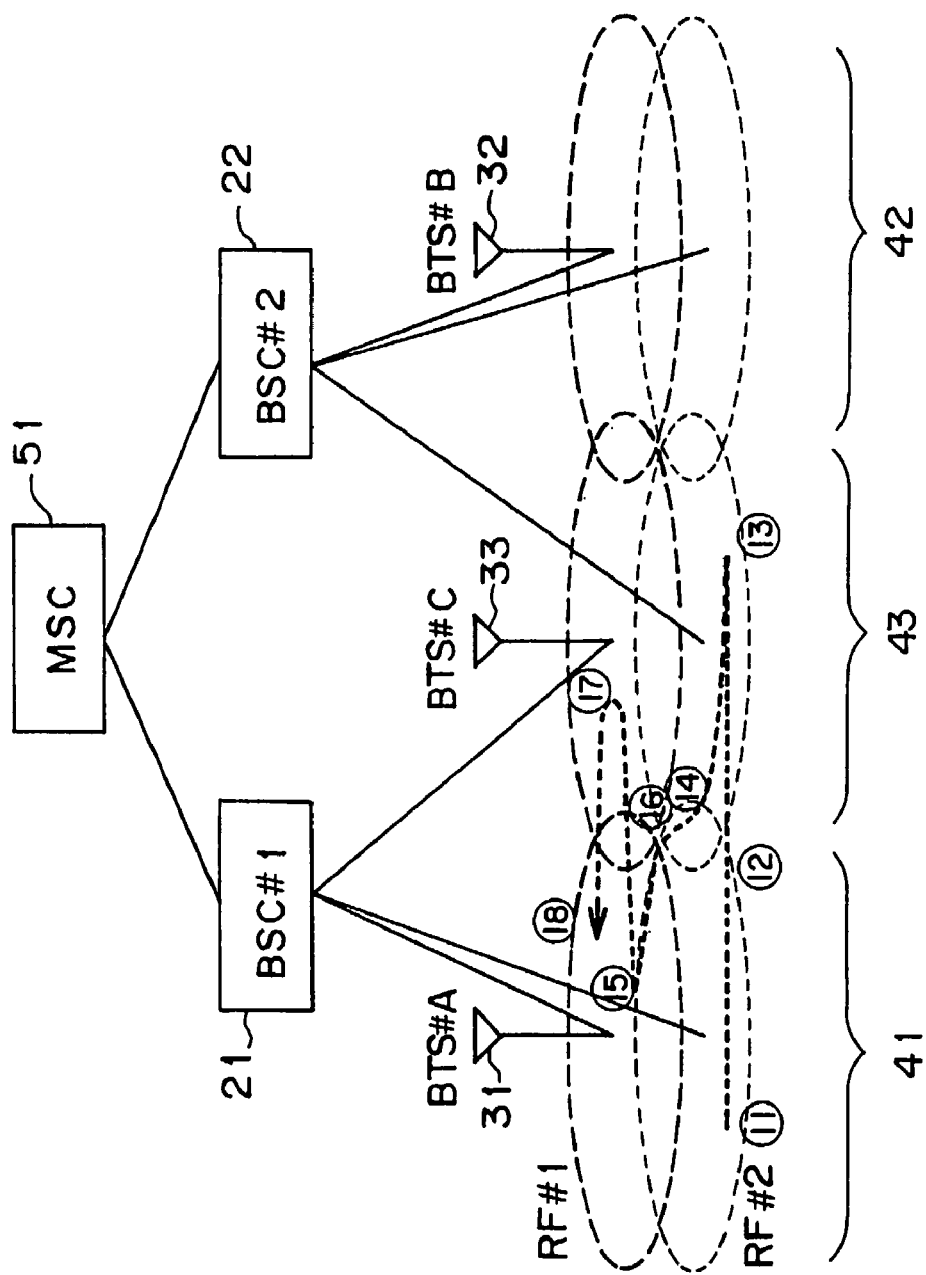
FIG. 9 shows a hand-off operation in the mobile communications system of the embodiment.
Figure 10:
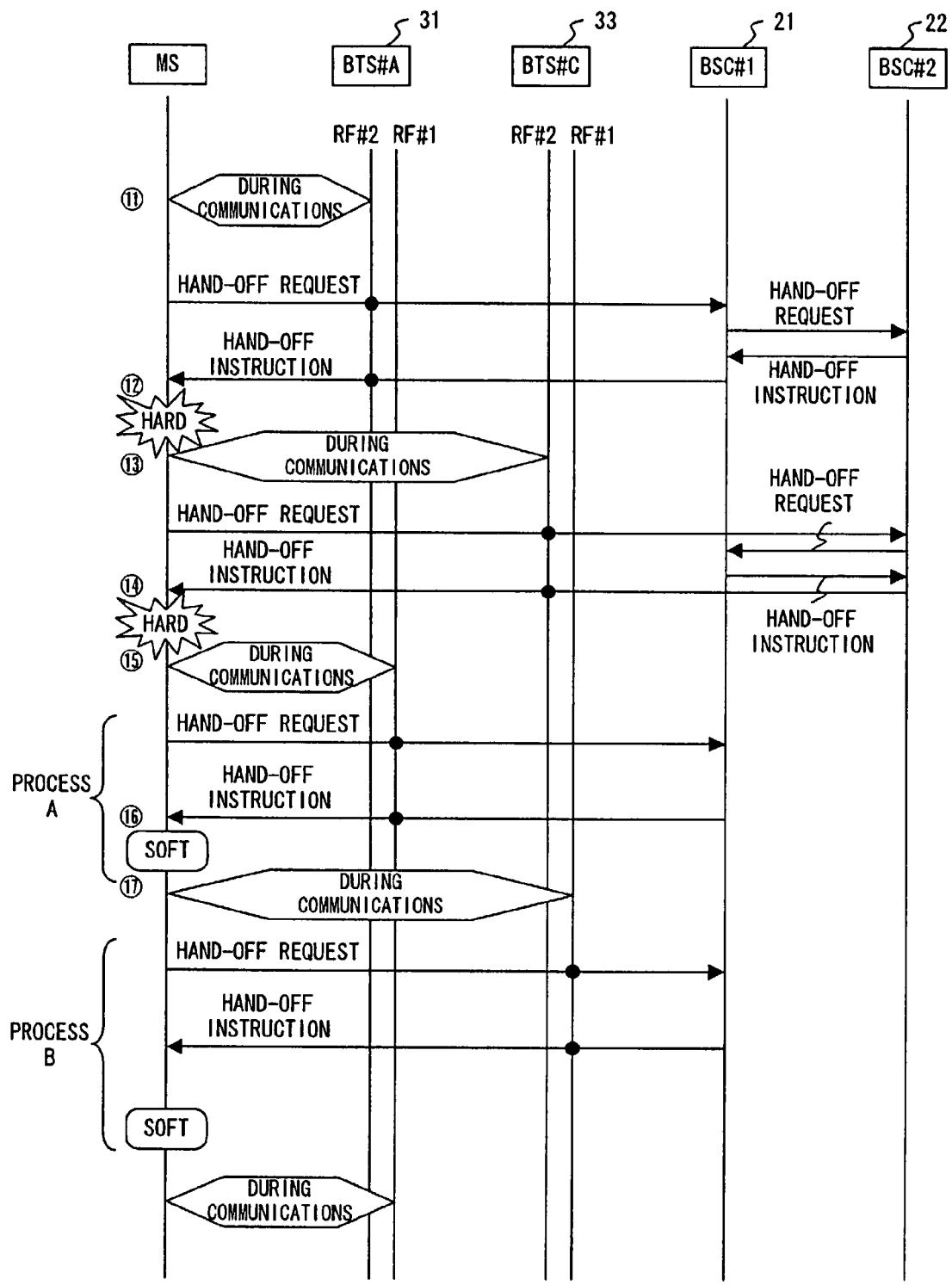
FIG. 10 is a sequence chart showing a hand-off operation.

Next, the hand-off operation of this embodiment is described in detail with reference to FIGS. 9 and 10. In FIG. 9, an arrow symbol with (11) through (18) indicates the travel track of a mobile station. In this example, the mobile station moves back and forth between the general cell 41 and boundary cell 43. The sequence in FIG. 10 shows the operations of both base station devices and base station controllers in the case where a mobile station moves along a route from (11) through (18) shown in FIG. 9.

A mobile station (MS) is located in the general cell 41 and is accommodated in the base station device 31 (state 11).

Here, the mobile station is connected to the base station device 31 through a channel with a frequency RF#2.

When the mobile station moves up to an overlapped area between the general cell 41 and the boundary cell 43 while holding communications, the mobile station transmits a hand-off request to the base station device 31 that accommodates the mobile station. This movement is detected by the value of the receiving electric field intensity of a pilot signal transmitted from BTS 33 and the like. On receipt of this hand-off request, the base station device 31 notifies a base station controller 21 that accommodates the base station device 31, of the request.

On receipt of the hand-off request, the base station controller 21 performs steps S2 through S4 shown in FIG. 6. Here, since the mobile station moves from a general cell to a boundary cell, "No" is obtained in step S3. Then, "a frequency RF#2 is used in the boundary cell 43" is obtained in step S6.

The base station controller 21 refers to a base station management table and judges whether the base station controller 21 itself controls communications conducted using the frequency RF#2 in the boundary cell 43. In the example shown in FIG. 9, a base station controller 22 controls the communications conducted using the frequency RF #2 in the boundary cell 43. Therefore, the base station controller 21 transmits a hand-off request to the base station controller 22. This hand-off request includes information indicating that "a frequency RF#2 is used in the boundary cell 43".

A variety of information is exchanged between base station controllers through the mobile services switching center 51. The base station management table is described later.

On receipt of the hand-off request, the base station controller 22 returns a hand-off instruction to the base station controller 21. This hand-off instruction includes information indicating that "a frequency RF#2 is used in a boundary cell 43". Then, the base station controller 21 notifies the mobile station of the hand-off instruction through the base station device 31. When the base station controller 22 generates the hand-off instruction, the base station device 33 secures a channel with the frequency RF#2, for this mobile station.

The mobile station is connected to the base station device 33 provided in the boundary cell 43 using the frequency RF#2 according to the received hand-off instruction. Thus, the hand-off operation is terminated.

Communications of the mobile station is controlled by the base station controller 21 before the hand-off, while the communication is controlled by the base station controller 22 after the hand-off. For this reason, communications between the mobile station and a base station device is temporarily disconnected. In other words, when the mobile station moves from the general cell 41 to the boundary 43 (11 through 13), a hard hand-off occurs.

After this hand-off, the mobile station is accommodated in the base station device 33 (state 13). While being located in the boundary cell 43, the mobile station uses the frequency RF#2.

Then, when moving up to an overlapped area between the boundary cell 43 and the general cell 41 while holding communications, the mobile station transmits a hand-off request to the base station device 33 that accommodates the mobile station. On receipt of this hand-off request, the base station device 33 recognizes that the mobile station uses the frequency RF#2 and notifies the base station controller 22 of the hand-off request.

On receipt of the hand-off request, the base station controller 22 performs steps S2 through S4 in FIG. 6. Here, since the mobile station moves from a boundary cell to a general cell, "Yes" is obtained in step S3. On the other hand, communications conducted using the frequency RF #2 in the boundary cell 43 is controlled by the base station controller 22. However, the base station device 31 provided in the general cell 41 is accommodated in the base station controller 21. Therefore, "No" is obtained in step S4. As a result, "a frequency RF#1 is used in the general cell 41", is obtained in step S5.

The base station controller 22 transmits a hand-off request to the base station controller 21 that accommodates the base station device 31 provided in a destination cell of the mobile station. This hand-off request includes information indication that "a frequency RF#1 is used in a general cell 41".

On receipt of the hand-off request, the base station controller 21 returns a hand-off instruction to the base station controller 22. This hand-off instruction includes information indicating that "a frequency RF#1 is used in a general cell 41". Then, the base station controller 22 notifies the mobile station of the hand-off instruction through the base station device 33.

The mobile station is connected to the base station device 31 provided in the general cell 41 using the frequency RF#1, according to the received hand-off instruction. Thus, the hand-off operation is terminated. Then, the mobile station continues the communications conducted using the frequency RF#1.

In the hand-off operation, communications of the mobile station is controlled by the base station controller 22 before the hand-off, while the communication is controlled by the base station controller 21 after the hand-off. For this reason, communications between the mobile station and a base station device is also temporarily disconnected. That is, when the mobile station moves from the boundary cell 43 to the general cell 41 (13 through 15), a hard hand-off occurs.

Then, when moving up to the overlapped area between the general cell 41 and boundary cell 43 while holding communications again, the mobile station transmits a hand-off request to the base station device 31 again. On receipt of the hand-off request, the base station device 31 notifies the base station controller 21 of the request as in the case described above.

On receipt of this hand-off request, the base station controller 21 performs steps S2 through S4 shown in FIG. 6 again. As in the case described above, "No" is obtained in step S3. However, at this time, the mobile station uses the frequency RF#1. Therefore, "a frequency RF#1 is used in the boundary cell 43" is obtained in step S6.

Then, the base station controller 21 judges whether the base station controller 21 itself controls communications conducted using the frequency RF#1 in the boundary cell 43. In the example shown in FIG. 9, the communications conducted using the frequency RF#1 in the boundary cell 43 is controlled by the base station controller 21. Thus, the base station controller 21 processes the hand-off request without transmitting/receiving information to/from the base station controller 22 and generates a hand-off instruction by itself. This hand-off instruction includes information indicating that "a frequency RF#1 is used in a boundary cell 43".

The base station controller 21 notifies the mobile station of this hand-off instruction through the base station device 31. Then, the mobile station is connected to the base station device 33 provided in the boundary cell 33 using the frequency RF#1, according to the received hand-off instruction. Then, the hand-off operation is terminated.

In this hand-off operation, a base station controller to control the communication of a mobile station before and after the hand-off is unchanged, and a frequency used between the mobile station and a corresponding base station device before and after the hand-off is unchanged. Therefore, there is no disconnection in communications between the mobile station and base station devices. That is, when the mobile station moves from the general cell 41 to the boundary cell 43 (15–17), a soft hand-off is performed.

Then, when moving up to the overlapped area between the boundary cell 43 and general cell 41 again while holding communications, the mobile station transmits a hand-off request to the base station device 33. When recognizing that the mobile station uses the frequency RF#1 at this point, the base station device 33 notifies the base station controller 21 of the hand-off request.

On receipt of the hand-off request, the base station controller 21 performs steps S2 through S4 shown in FIG. 6. In this case, "Yes" is obtained in step S3, as described above. However, communications conducted using the frequency RF#1 in the boundary cell 43 is controlled by the base station controller 21. For this reason, "Yes" is obtained in step S4. Specifically, "a frequency RF#1 is used in a general cell 41", is obtained in step S6.

Then, since the communications conducted using the frequency RF#1 in the boundary cell 43 is controlled by the base station controller 21, the base station controller 21 processes the hand-off request without transmitting/receiving information to/from the base station controller 22 and generates a hand-off instruction by itself. This hand-off request includes information indicating that "a frequency RF#1 is used in a general cell 41".

The base station controller 21 notifies the mobile station of this hand-off instruction through the base station device 33. Then, the mobile station is connected to the base station device 31 provided in the general cell 41 using the frequency RF#1 according to the received hand-off instruction. Then, the hand-off operation is terminated.

In this hand-off operation, a base station controller to control the communication of a mobile station before and after the hand-off is unchanged, and a frequency used between the mobile station and a corresponding base station device before and after the hand-off is unchanged. Therefore, there is no disconnection in communications between the mobile station and base station devices. That is, when the mobile station moves from the boundary cell 43 to the general cell 41 (17–18), a soft hand-off is performed.

Then, if the mobile station moves back and forth between the general cell 41 and boundary cell 43, a soft hand-off is always performed. That is, when the mobile station moves from the general cell 41 to the boundary cell 43, a soft hand-off is performed according to the process-A shown in FIG. 10. When the mobile station moves from the boundary cell 43 to general cell 41, a soft hand-off is performed according to the process-B.

In the example shown in FIGS. 9 and 10, it is assumed that a frequency RF#2 is initially used in the general cell 41. However, if a frequency RF#1 is initially used in the general cell 41, the hand-off operation starts from the process-A shown in FIG. 10. In this case, when the mobile station moves between the general cell 41 and boundary cell 43, there is no hard hand-off, and a soft hand-off is always performed.

In the example described above, a case where a mobile station moves between the general cell 41 and boundary cell 43 is described. However, when the mobile station moves between the general cell 42 and boundary cell 43, similarly, the occurrence frequency of hard hand-offs can also be reduced.

Figure 11A:
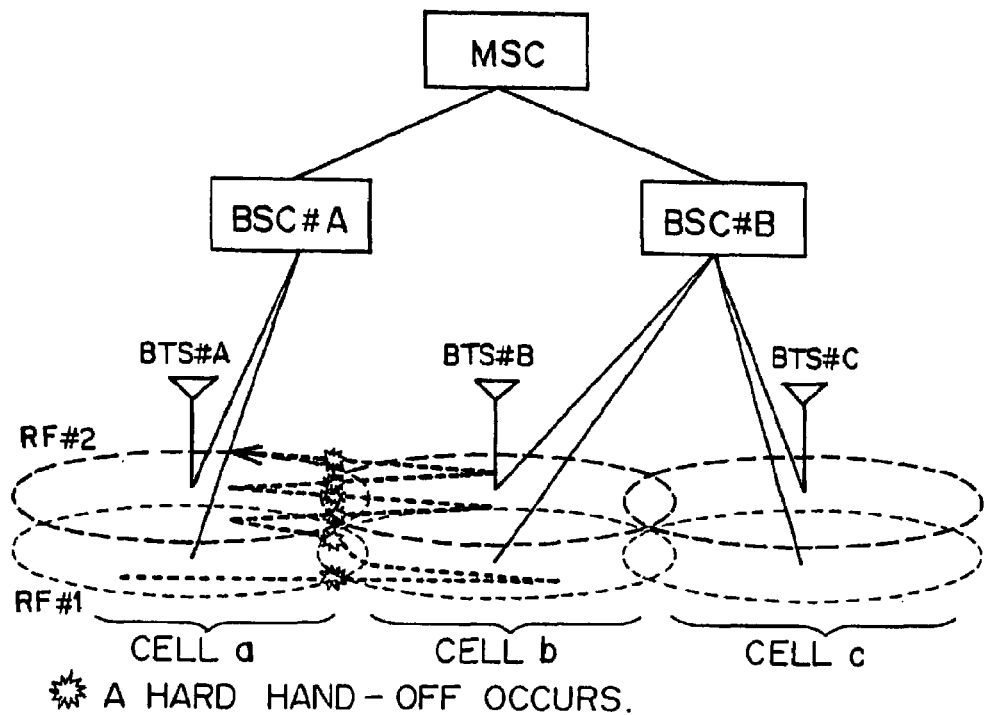
FIGS. 11A and 11B show the effect of the mobile communications system in the embodiment.
Figure 11B:
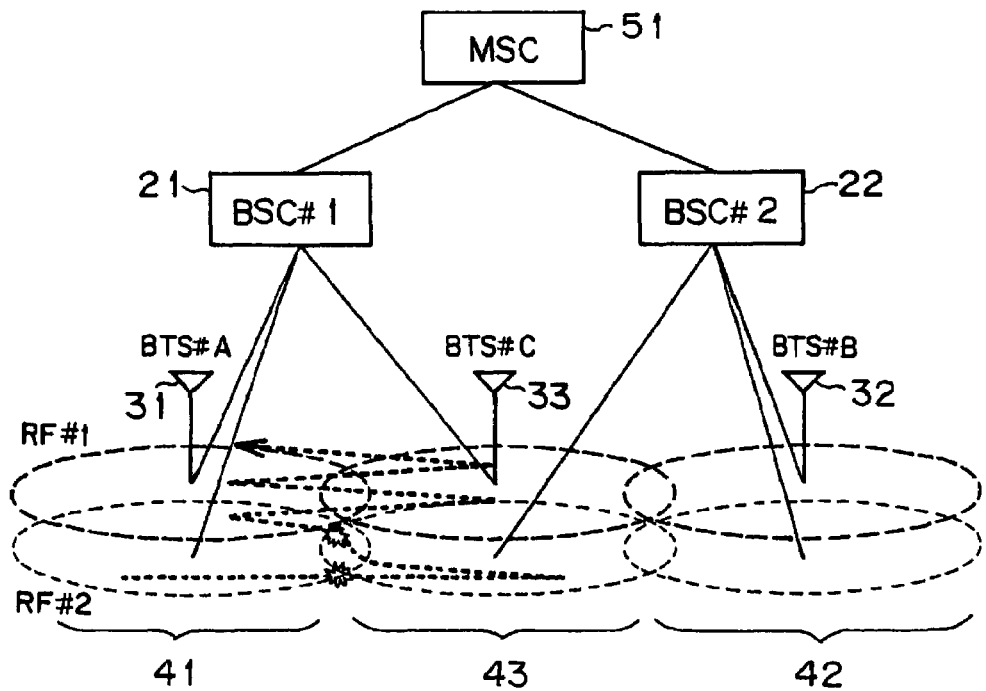

FIGS. 11A and 11B show the effects of the mobile communications system of the embodiment. FIG. 11A shows a hand-off in the existing mobile communications system. FIG. 11B shows a hand-off in the mobile communications system of the embodiment.

In the existing mobile communications system, each of base station devices provided in a corresponding cell is accommodated in one base station controller. In FIG. 11A, for example, a base station device BTS#A is accommodated only in a base station controller BSC#A, and a base station device BTS#B is accommodated only in a base station controller BSC#B. For this reason, as shown in FIG. 11A, when a mobile station moves back and forth between the cell-a and cell-b, in a case where a base station device provided in cell-a and a base station device provided in cell-b are controlled by different base station controllers, a hard hand-off is repeated.

However, in the mobile communications system of the embodiment, when a mobile station moves back and forth between a general unit and a boundary cell, as described with reference to FIGS. 9 and 10, at most only two hard hand-offs occur, and then soft hand-offs are performed. Therefore, even if the mobile station repeatedly moves back and forth between the general cell 41 and the boundary cell 43 in FIG. 11B, at most only two hard hand-offs occur.

As described above, in the mobile communications system of this embodiment, even if a mobile station moves in the vicinity of a boundary between communications areas, each of which is controlled by a different base station controller, the occurrence frequency of hard hand-offs can be suppressed. As a result, a user is not disconcerted by instantaneous disconnection due to a hand-off.

As described with reference to FIG. 5, in this embodiment, the base station device 33 provided in the boundary cell 43 is connected to (accommodated in) both the base station controllers 21 and 22 by two independent physical transmission lines. Then, information to be exchanged between the base station device 33 and base station controller 21 and information to be exchanged between the base station device 33 and base station controller 22 are transmitted through respective independently-provided physical transmission lines.

Figure 12:
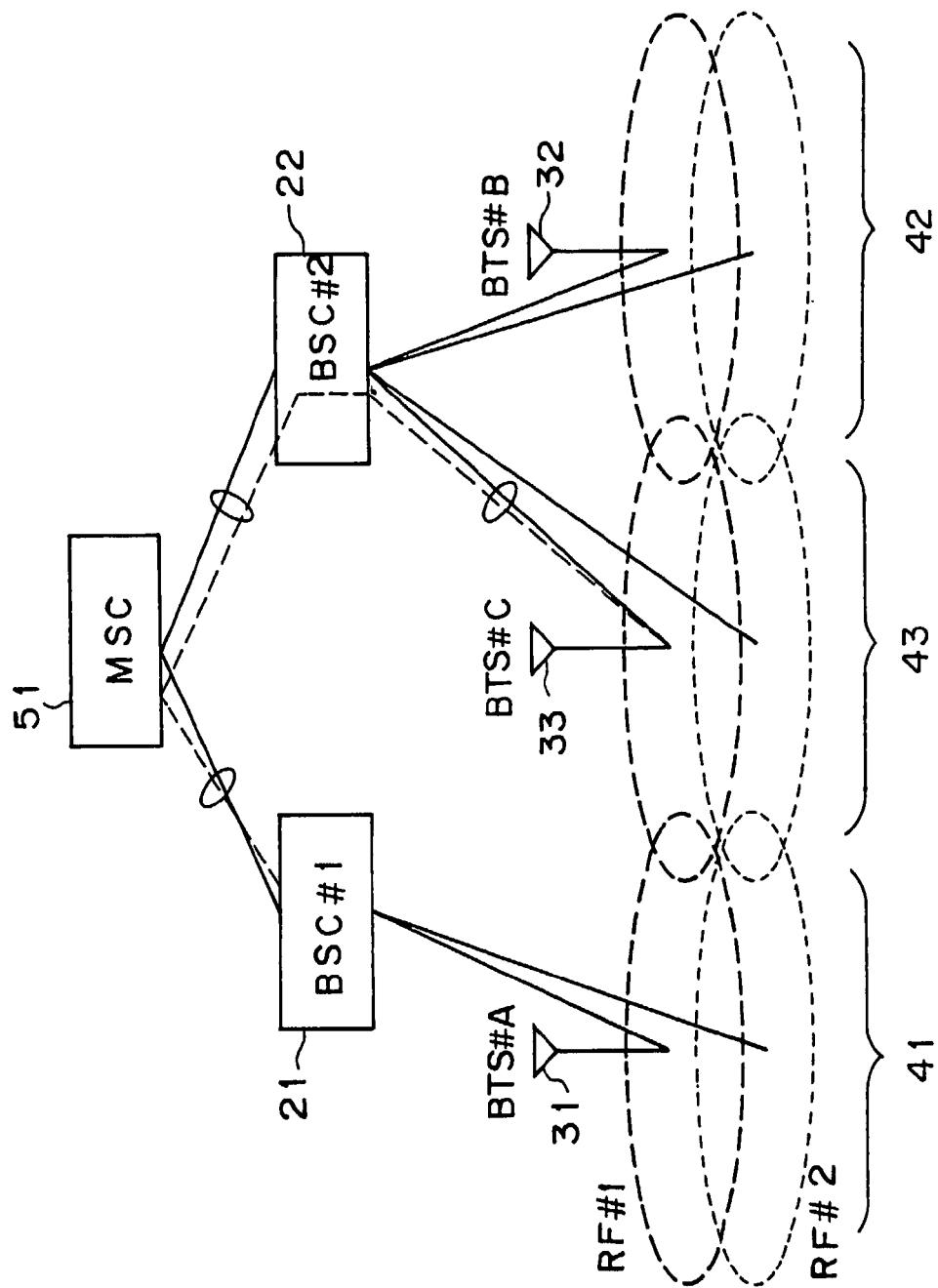
FIG. 12 shows an example in which a base station device is accommodated in a base station controller through a logical path.

However, the mobile communications system of the embodiment is not limited to this configuration. Specifically, a base station controller does not always need to accommodate a base station device provided in a boundary cell through a physical transmission line. As shown in FIG. 12, the base station controller of the base station can also accommodate the base station device through a logical path (virtual path). In FIG. 12, physical paths and virtual paths are expressed by solid lines and broken lines, respectively.

In the example shown in FIG. 12, a base station device 33 provided in a boundary cell 43 is accommodated in a base station controller 22 through a physical transmission line, and is also accommodated in a base station controller 21 through logical paths established in a transmission line for connecting the base station device 33 and base station controller 22, a transmission line for connecting the base station controller 22 and a mobile services switching center 51 and a transmission line for connecting the mobile services switching center 51 and base station controller 21. Specifically, the logical paths are established in such a way that the communications conducted by the base station device 33 using a frequency RF#1 can be controlled by the base station controller 21.

With this system configuration, the number of physical transmission lines required to connect a base station device provided in a boundary cell and a base station controller can be reduced, and the cost for establishing a mobile communications system can be reduced accordingly. If base station controllers are directly connected to each other by a physical transmission line or a radio path without through switching center, the transmission line and the like can also be used.

Figure 13:
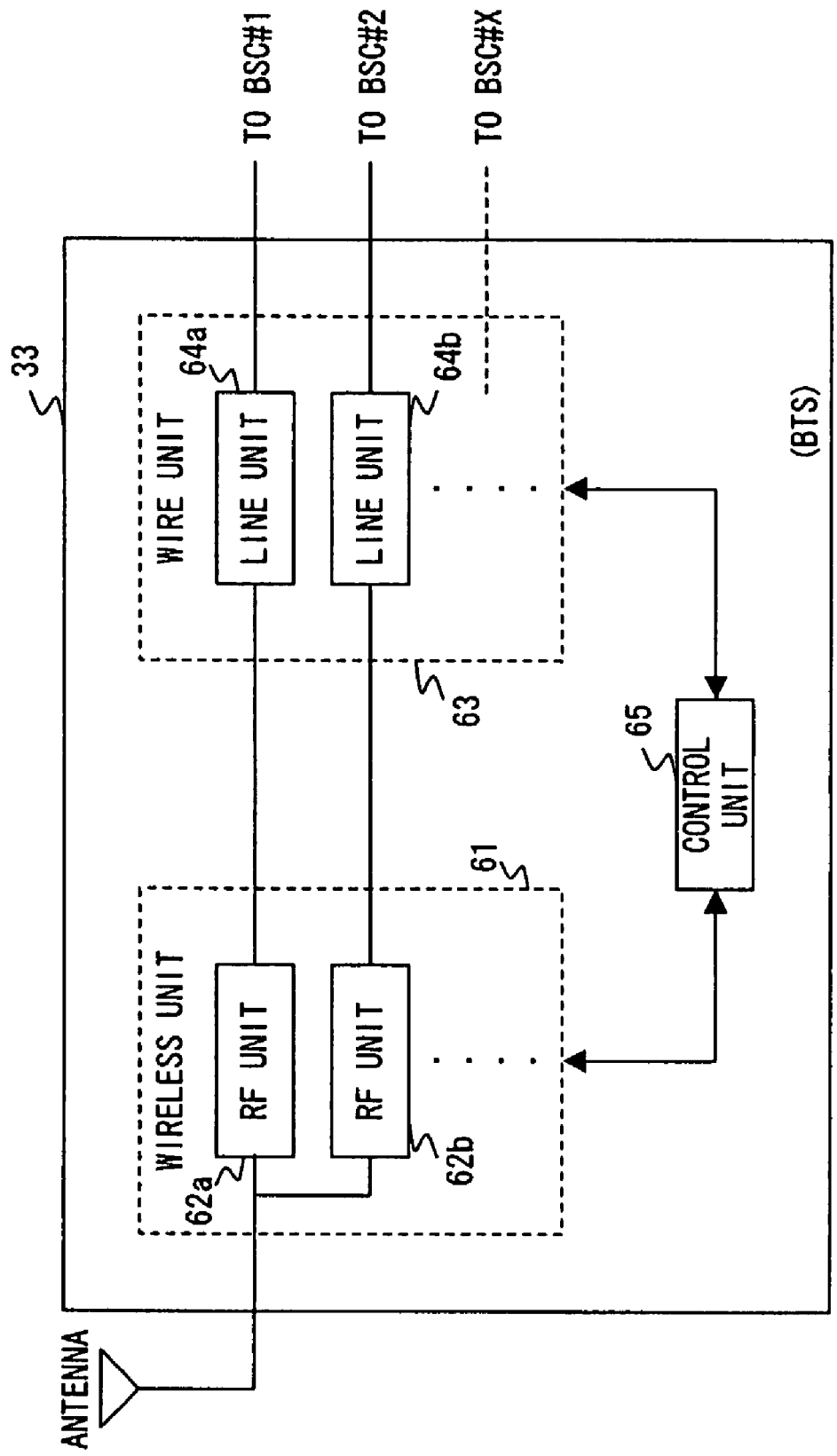
FIG. 13 shows a configuration of a base station device provided in a boundary cell.

FIG. 13 shows the configuration of a base station device provided in a boundary cell. In this example, a base station device and a plurality of base station controllers are connected by a plurality of independent physical transmission lines.

A base station device 33 is comprised of a wireless unit 61 and a wire unit 63. The wireless unit 61 transmits/receives radio data to/from mobile stations. RF units 62a, 62b, . . . , are provided for each frequency allocated to a boundary cell 43. Signals from the base station device to a mobile station are outputted from the RF units 62a, 62b, . . . , for each frequency, are multiplexed and are transmitted from an antenna. Signals from a mobile station to the base station device 33 are demultiplexed for each frequency and are distributed to corresponding RF units.

The wire unit 63 transmits/receives data to/from a base station controller. The line units 64a, 64b, . . . , are provided for the RF units 62a, 62b, and terminate respective lines (physical transmission lines) for connecting the base station device and the plurality of base station controllers. A control unit 65 controls the operation of a base station device.

In FIG. 13, it is assumed that the RF unit 62a is provided for a frequency RF#1. In this case, data transmitted from a mobile station using the frequency RF#1 are received by the RF unit 62a and are transmitted to a base station controller BSC#1 through the line unit 64a. Data transmitted from the base station controller BSC#1 are transmitted to a mobile station using the frequency RF#1 in the boundary cell 43 through the line unit 64a and RF unit 62a.

Figure 14:
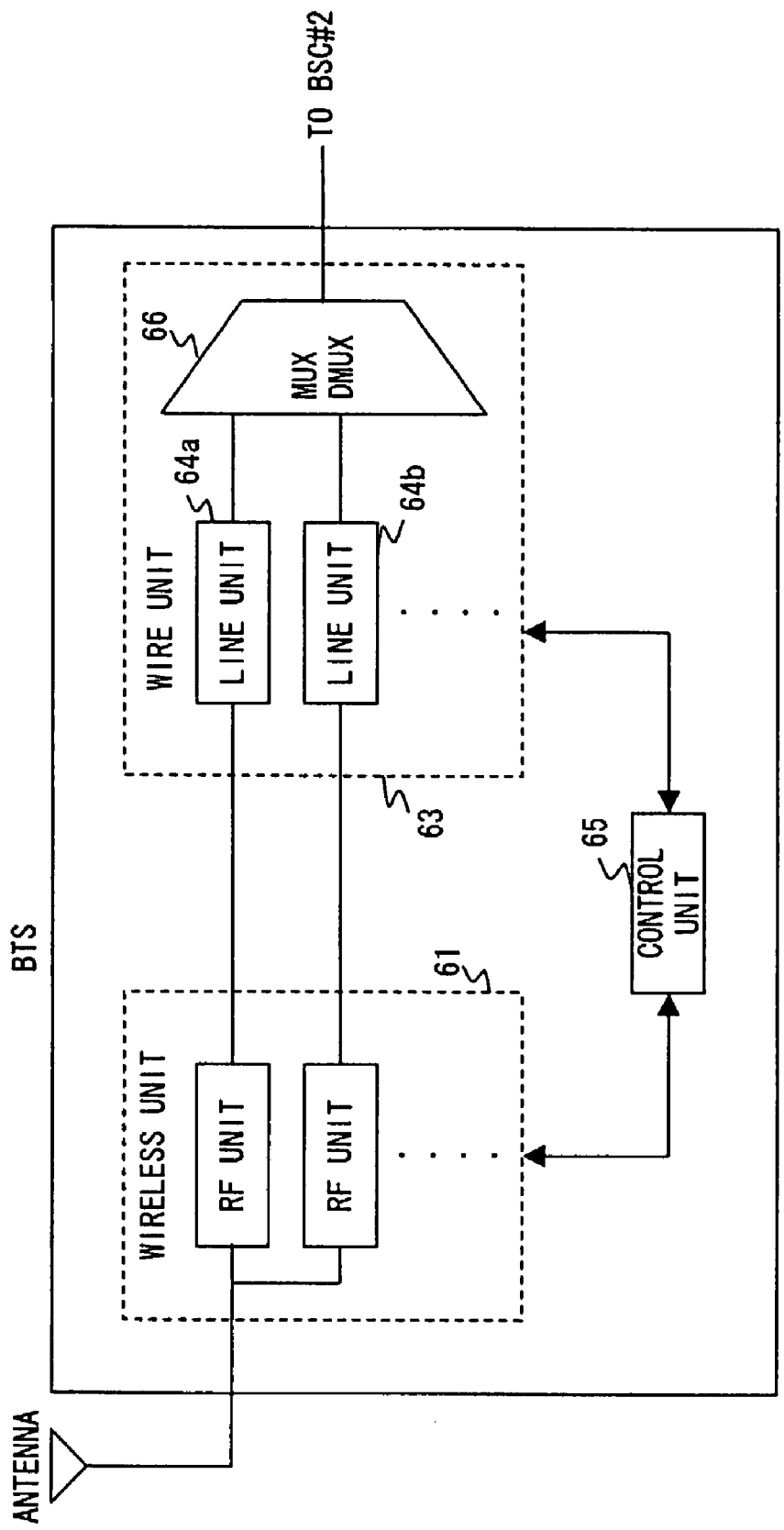
FIG. 14 shows another configuration of a base station device provided in a boundary cell.

FIG. 14 shows another configuration of a base station device provided in a boundary cell. This base station device is provided in a boundary cell in the mobile communications system shown in FIG. 12.

In the system shown in FIG. 12, the base station device 33 provided in a boundary cell is connected only to a base station controller 22 by a physical transmission line. Therefore, data transmitted from the base station device 33 to a plurality of base station controllers are multiplexed by a multiplex/demultiplex unit 66 and are outputted to the transmission line. Data from the plurality of base station controllers to the base station device 33 are multiplexed and are transmitted through the transmission line. The multiplex/demultiplex unit 66 demultiplexes the multiplexed data and distributes demultiplexed data to corresponding line units 64a, 64b, . . . The operations of the RF units 62a, 62b, . . . , and line units 64a, 64b, . . . , are basically the same as those described with reference to FIG. 13.

FIG. 15 shows the configuration and operation of a base station controller for accommodating base station devices provided in a boundary cell. Here, a base station controller provided in the mobile communications system in FIG. 12 is described.

The base station controller 21 is connected to the base station device 31, and the base station controller 22 is connected to the base station devices 32 and 33. However, in this mobile communications system, logical paths are established in such a way that communications conducted by the base station device 33 using the frequency RF#1 can be controlled by the base station controller 21

A BTS interface unit 71 terminates transmission lines for connecting a base station controller and the corresponding base station devices. A control unit 72 controls this base station controller. A BTS control unit 73 controls corresponding base stations with reference to a base station management table 74. The base station management table 74 registers information about all base station devices accommodated in this base station controller. The information for the base station devices is registered and managed for each frequency allocated to each cell. This base station management table 74 also registers information for identifying a base station controller that controls communications with base station devices provided in a boundary cell for each frequency. For example, the base station management table 74 registers information indicating that "communications conducted by the base station device 33 using a frequency RF#1 is controlled by the base station controller 21" and information indicating that "communications conducted by the base station device 33 using a frequency RF#2 is controlled by the base station controller 22". An MSC interface unit 75, which is connected to the BTS interface unit 71, terminates transmission lines for connecting this base station controller and mobile services switching center 51.

In this system, information transmitted from the base station device 32 is received by the base station controller 22 and is processed by the base station controller 22 itself. On receipt of information transmitted from the base station device 33, the BTS interface unit 71 judges whether the received information will be accepted or will be transferred to the mobile services switching center 51, based on information registered in the base station management table 74. In this embodiment, when the BTS interface unit 71 receives information from the base station device 33, it accepts information relating to communications conducted using the frequency RF#2 but transfers information relating to communications conducted using the frequency RF#1 to the mobile services switching center 51. On receipt of information transmitted from a base station controller, the mobile services switching center 51 transfers the information to a corresponding base station controller according to the address attached to the information.

Figure 16:
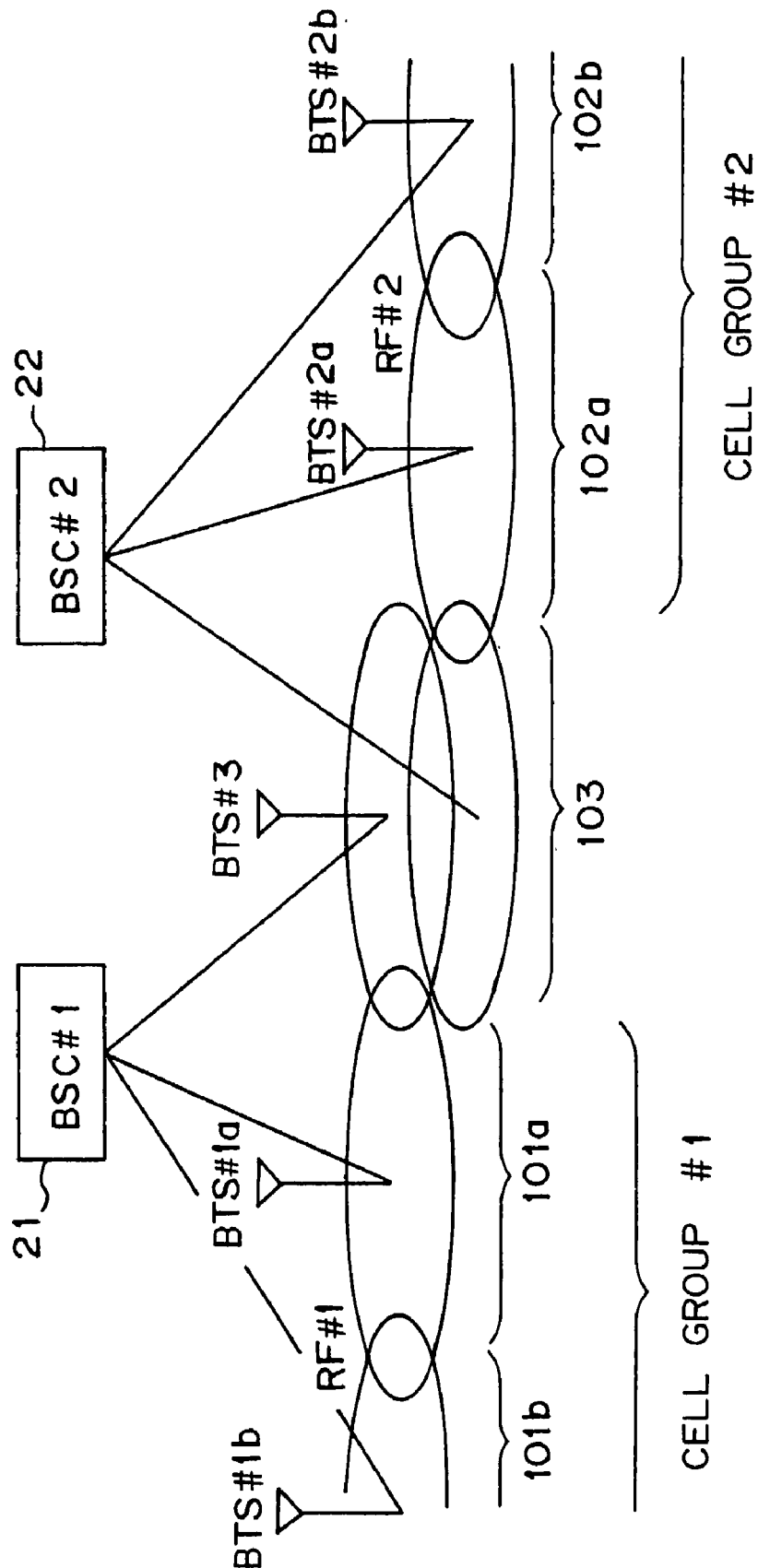
FIG. 16 shows the configuration of the mobile communications system in another aspect of the present invention.

In the above embodiment, as shown in FIG. 5, two frequencies (RF#1 and RF#2) are allocated to each cell, however the mobile communications system of the present invention is not limited to this configuration. Specifically, for example, as shown in FIG. 16, in the mobile communications system of the present invention, a different frequency is allocated to each of adjacent cell groups, and all the frequencies are allocated to a boundary cell located on a boundary between those cell groups. In the example shown in FIG. 16, a frequency RF#1 is allocated to a cell group#1 including general cells 101a and 101b, and a frequency RF#2 is allocated to a cell group #2 including general cells 102a and 102b. Then, both the frequencies RF#1 and RF#2 are allocated to a boundary cell 103 located in a boundary area between the cell groups #1 and #2.

A hand-off operation in the mobile communications system with the configuration described above basically follows the flowchart shown in FIG. 6. Therefore, when a mobile station moves from a general cell to a boundary cell in this system, a soft hand-off is always performed. For example, when a mobile station moves from the general cell 101a to the boundary cell 103, the mobile station uses in the boundary cell 103 the same frequency as that used in the general cell 101a. In this case, since a mobile station have used the frequency RF#1 in the general cell 101a, the mobile station uses the frequency RF#1 in the boundary cell 103 too. Here, the base station controller 21 controls communications using the frequency RF#1 in the boundary cell 103. Therefore, in this case, a soft hand-off is performed.

If a mobile station moves from a boundary cell to a general cell, whether a hard hand-off occurs or a soft hand-off is performed depends on a frequency used in the boundary cell by the mobile station.

For example, when a mobile station using a frequency RF#1 in the boundary cell 103 moves to the general cell 101a, frequencies used by the mobile station before and after the hand-off are the same, and the communications conducted before and after the hand-off is controlled by the base station controller 21. Therefore, in this case, a soft hand-off is performed. However, when a mobile station using a frequency RF#2 in the boundary cell 103 moves to the general cell 101a, respective frequencies used by the mobile station before and after a hand-off are different. In addition, the base station controller 22 performs control of communications conducted before the hand-off, while the base station controller 21 performs control of communications conducted after the hand-off. Therefore, in this case, communications between a mobile station and a base station device are temporarily disconnected. In other words, in this case, a hard hand-off occurs.

If a mobile station moves from the general cell 102a to the boundary cell 103, the same operations are performed.

Similarly, in the system shown in FIG. 16, a mobile station moves to and from a boundary area, the occurrence frequency of hard hand-offs can also be reduced. In addition, in the system shown in FIG. 16, one frequency is allocated to each general cell, the configurations of a base station device and a base station controller can be simplified. Furthermore, every time a mobile station moves from a general cell to a boundary cell, a soft hand-off is performed. Therefore, the occurrence of hard hand-offs can be further reduced.

Although in the embodiments described above, two communications areas controlled by corresponding base station controller are assumed to be adjacent, the present invention is also applicable to a system that three or more communications areas are adjacent to one another, as shown in FIG. 17. In this case, three or more frequencies can be allocated to each cell. Alternatively, different frequencies are allocated to adjacent communications areas and all of the different frequencies are allocated to a boundary cell adjacent to the communications areas. In the example shown in FIG. 17, a cell controlled by BTS#4 is adjacent to three cells (cells controlled by BTS#1-BTS#3, respectively) In the cells respectively controlled by BTS#1-BTS#3, frequencies RF#1-RF#3 are used, respectively, and in a cell controlled by BTS#4, those three frequencies (RF#1-RF#3) are used.

In the above embodiment, as shown in FIG. 1, a base station device provided in a corresponding cell is accommodated by a base station controller, and the base station controller is accommodated by a mobile services switching center. However, the present invention is not limited to this configuration. For example, the present invention can be applied to a system in which a base station device provided in a corresponding cell is directly connected to a mobile services switching center. Specifically, the present invention can be applied to a mobile communications system in which a base station device is accommodated in a controller (including a base station controller and a mobile services switching center) that belongs to a higher layer above the base station device.

Although the present invention is suitable for a CDMA communications system, the present invention is also useful for other communications systems (for example, TDM).

As described above, according to the present invention, when a mobile station moves across a boundary between communications areas, the occurrence frequency of hard hand-offs can be reduced. Therefore, communications are seldom temporarily disconnected due to a hand-off, and, accordingly, a user is rarely disconcerted.

The present invention can be used in a mobile communications system, such as a CDMA communications system and the like.

What is claimed is:

1. A mobile communications system in which first and second frequencies are allocated to each wireless communications area, comprising:

a first base station device provided in a first wireless communications area;

a second base station device provided in a second wireless communications area;

a third base station device provided in a third wireless communications area adjacent to the first and second wireless communications areas;

a first base station controller controlling communications conducted by said first base station device and said third base station device; and a second base station controller controlling communications conducted by said second base station device and said third base station device, wherein each of said first, second and third base station devices can use both of the first and second frequencies to communicate with a mobile station.

said first base station controller controls communications conducted by said first base station device using the first frequency and the second frequency and controls communications conducted by said third base station device using the first frequency but does not control communications conducted by said third base station device using the second frequency, said second base station controller controls communications conducted by said second base station device using the first frequency and the second frequency and controls communications conducted by said third base station device using the second frequency but does not control communications conducted by said third base station device using the first frequency, and said first base station controller allocates the same frequency to a radio channel between a mobile station and a corresponding base station device before and after the mobile station travels from the first wireless communications area to the third wireless communications area in a case where the mobile station has used the first frequency in the first wireless communications area, and allocates the first frequency to the radio channel after the mobile station travels from the third wireless communications area to the first wireless communications area.

2. The mobile communications system according to claim 1, wherein when a mobile station using the first frequency in the first wireless communications area moves from the first wireless communications area to the third wireless communications area, said third base station device communicates with the mobile station using the first frequency.

3. The mobile communications system according to claim 1, wherein when a mobile station using the second frequency in the first wireless communications area moves from the first wireless communications area to the third wireless communications area, said third base station device communicates with the mobile station using the second frequency.

4. The mobile communications system according to claim 1, wherein when a mobile station using the first frequency in the third wireless communications area moves from the third wireless communications area to the first wireless communications area, said first base station device communicates with the mobile station using the first frequency.

5. The mobile communications system according to claim 1, wherein when a mobile station using the second frequency in the third wireless communications area moves from the third wireless communications area to the first wireless communications area, said first base station device communicates with the mobile station using the first frequency.

6. The mobile communications system according to claim 1, wherein said third base station device is connected to said first controller via a first transmission line and is connected to said second controller via a second transmission line.

7. The mobile communications system according to claim 1, wherein said third base station device and said second controller are connected via a physical transmission line, said second controller is connected to said first controller via a switching device, and said third base station device is accommodated in said first controller with a logical path established via said second controller and the switching device.

8. A mobile communications system, comprising:
a first base station device provided in a first wireless communications area to which at least a first frequency is allocated;
a second base station device provided in a second wireless communications area to which at least a second frequency is allocated;
a third base station device provided in a third wireless communications area, which is adjacent to the first and second wireless communications areas and to which the first and second frequencies are allocated;
a first base station controller controlling communications conducted by said first base station device and said third base station device; and
a second base station controller controlling communications conducted by said second base station device and said third base station device, wherein
each of said first, second and third base station devices can use both of the first and second frequencies to communicate with a mobile station,
said first base station controller controls communications conducted by said first base station device using the first frequency and the second frequency and controls communications conducted by said third base station device using the first frequency but does not control communications conducted by said third base station device using the second frequency,
said second base station controller controls communications conducted by said second base station device using the first frequency and the second frequency and controls communications conducted by said third base station device using the second frequency but does not control communications conducted by said third base station device using the first frequency, and
said first base station controller allocates the same frequency to a radio channel between a mobile station and a corresponding base station device before and after the mobile station travels from the first wireless communications area to the third wireless communications area in a case where the mobile station has used the first frequency in the first wireless communications area, and allocates the first frequency to the radio channel after the mobile station travels from the third wireless communications area to the first wireless communications area.

9. The mobile communications system according to claim 8, wherein when a mobile station using the first frequency in the first wireless communications area moves from the first wireless communications area to the third wireless communications area, said third base station device communicates with the mobile station using the first frequency.

10. The mobile communications system according to claim 8, wherein when a mobile station using the first frequency in the third wireless communications area moves from the third wireless communications area to the first wireless communications area, said first base station device communicates with the mobile station using the first frequency.

11. A mobile communications system, comprising:
a first base station device provided in a first wireless communications area to which at least a first frequency is allocated;
a second base station device provided in a second wireless communications area to which at least a second frequency is allocated;
a third base station device provided in a third wireless communications area, which is adjacent to the first and second wireless communications areas and to which the first and second frequencies are allocated for same multiple access scheme, wherein said third base station device is accommodated in different controllers for each allocated frequency;
a first base station controller controlling communications conducted by said first base station device and said third base station device; and
a second base station controller controlling communications conducted by said second base station device and said third base station device, wherein
each of said first, second and third base station devices can use both of the first and second frequencies to communicate with a mobile station,
said first base station controller controls communications conducted by said first base station device using the first frequency and the second frequency and controls communications conducted by said third base station device using the first frequency but does not control communications conducted by said third base station device using the second frequency,
said second base station controller controls communications conducted by said second base station device using the first frequency and the second frequency and controls communications conducted by said third base station device using the second frequency but does not control communications conducted by said third base station device using the first frequency, and
said first base station controller allocates the same frequency to a radio channel between a mobile station and a corresponding base station device before and after the mobile station travels from the first wireless communications area to the third wireless communications area in a case where the mobile station has used the first frequency in the first wireless communications area, and allocates the first frequency to the radio channel after the mobile station travels from the third wireless communications area to the first wireless communications area.

12. A communications control method in a mobile communications system including a first base station device provided in a first wireless communications area to which at least a first frequency is allocated, a second base station device provided in a second wireless communications area to which at least a second frequency is allocated, a third base station device provided in a third wireless communications area which is adjacent to the first and second wireless communications areas and to which the first and second frequencies are allocated, a first base station controller controlling the first base station device using the first frequency and a second base station controller controlling the second base station device using the second frequency, wherein the first base station controller controls communications conducted by the first base station device using the first frequency and the second frequency and controls communications conducted by the third base station device using the first frequency but not controlling communications conducted by said third base station device using the second frequency, the second base station controller controls communications conducted by the second base station device using the first frequency and the second frequency and controls the communications conducted by the third base station device using the second frequency but not controlling communications conducted by said third base station using the first frequency, and said first base station controller allocates the same frequency to a radio channel between a mobile station and a corresponding base station device before and after the mobile station travels from the first wireless communications area to the third wireless communications area in a case where the mobile station has used the first frequency in the first wireless communications area, and allocates the first frequency to the radio channel after the mobile station travels from the third wireless communications area to the first wireless communications area.

* * * * *